(12) United States Patent
Dowaki

(10) Patent No.: US 11,513,330 B2
(45) Date of Patent: Nov. 29, 2022

(54) FLUORESCENCE MICROSCOPE APPARATUS AND FLUORESCENCE MICROSCOPE SYSTEM

(71) Applicant: Sony Corporation, Tokyo (JP)

(72) Inventor: Suguru Dowaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 36 days.

(21) Appl. No.: 16/651,286

(22) PCT Filed: Jun. 19, 2018

(86) PCT No.: PCT/JP2018/023180
§ 371 (c)(1),
(2) Date: Mar. 26, 2020

(87) PCT Pub. No.: WO2019/069509
PCT Pub. Date: Apr. 11, 2019

(65) Prior Publication Data
US 2020/0225456 A1  Jul. 16, 2020

(30) Foreign Application Priority Data

Oct. 2, 2017 (JP) .............................. JP2017-193116

(51) Int. Cl.
*G01N 21/64* (2006.01)
*G02B 21/08* (2006.01)
(Continued)

(52) U.S. Cl.
CPC .......... *G02B 21/08* (2013.01); *G01N 21/6428* (2013.01); *G02B 21/16* (2013.01);
(Continued)

(58) Field of Classification Search
CPC ...... G02B 21/08; G02B 21/16; G02B 21/361; G02B 27/48; G02B 21/06; G02B 21/36;
(Continued)

(56) References Cited

U.S. PATENT DOCUMENTS 6,384,968 B1  5/2002  Ito et al.
6,898,004 B2  5/2005  Shimizu et al.
(Continued)

FOREIGN PATENT DOCUMENTS

EP  2204685 A1  7/2010
EP  2977809 A1  1/2016
(Continued)

OTHER PUBLICATIONS

International Search Report and English translation thereof dated Sep. 25, 2018 in connection with International Application No. PCT/JP2018/023180.
(Continued)

*Primary Examiner* — Marcus H Taningco
(74) *Attorney, Agent, or Firm* — Wolf, Greenfield & Sacks, P.C.

(57) ABSTRACT

Disclosed is a technology for illuminating a specimen in a desired uniform illumination pattern and capturing an image of a wide field of view in a low background illumination environment.
Provided, for example, is a fluorescence microscope apparatus including a first illumination optics, a second illumination optics, and an imaging optics. The first illumination optics includes a first light source for exciting fluorescence in a specimen, a spatial light modulation element, and a first illumination optical member for uniformly illuminating the spatial light modulation element. The second illumination optics includes a second illumination optical member for forming an image of a light beam from the spatial light modulation element on a specimen surface. The imaging optics includes an imaging optical member and an imaging element. The imaging optical member captures an image of the specimen surface.

19 Claims, 9 Drawing Sheets

(51) Int. Cl.
*G02B 21/16* (2006.01)
*G02B 21/36* (2006.01)
*G02B 27/48* (2006.01)

(52) U.S. Cl.
CPC ............ *G02B 21/361* (2013.01); *G02B 27/48* (2013.01); *G01N 2021/6439* (2013.01); *G01N 2201/0675* (2013.01)

(58) Field of Classification Search
CPC ....... G01N 21/6428; G01N 2021/6439; G01N 2201/0675; G01N 21/64
See application file for complete search history.

(56) References Cited

U.S. PATENT DOCUMENTS

| | | |
|---|---|---|
| 8,310,754 B2 | 11/2012 | Okugawa et al. |
| 8,957,958 B2 | 2/2015 | Kuppig et al. |
| 2003/0012420 A1 | 1/2003 | Verwoerd et al. |
| 2003/0063376 A1 | 4/2003 | Shimizu et al. |
| 2003/0081209 A1 | 5/2003 | Takahashi et al. |
| 2004/0159772 A1 | 8/2004 | Cartlidge et al. |
| 2006/0012872 A1* | 1/2006 | Hayashi ............ G01N 21/6452 359/386 |
| 2007/0195272 A1 | 8/2007 | Hendrix et al. |
| 2007/0263226 A1* | 11/2007 | Kurtz .................... G01N 21/21 356/492 |
| 2009/0086314 A1 | 4/2009 | Namba et al. |
| 2010/0182683 A1 | 7/2010 | Okugawa et al. |
| 2011/0182529 A1* | 7/2011 | Kempe ............. G02B 21/0076 382/274 |
| 2012/0081536 A1 | 4/2012 | Kuppig et al. |
| 2012/0112098 A1* | 5/2012 | Hoyt .................. G01N 21/6458 250/459.1 |
| 2013/0010098 A1 | 1/2013 | Kalkbrenner et al. |
| 2013/0182096 A1* | 7/2013 | Boccara ............... A61B 5/0068 348/79 |
| 2014/0152795 A1 | 6/2014 | Fujii |
| 2015/0055100 A1 | 2/2015 | Kaneda |
| 2015/0373312 A1 | 12/2015 | Miura |
| 2016/0025299 A1 | 1/2016 | Yamazaki |
| 2017/0031145 A1 | 2/2017 | Takiguchi |
| 2017/0176338 A1 | 6/2017 | Wu et al. |
| 2017/0208308 A1 | 7/2017 | Iguchi et al. |
| 2017/0272715 A1 | 9/2017 | Miura |
| 2020/0166739 A1* | 5/2020 | Aharoni ............ G02B 21/0008 |
| 2021/0172876 A1* | 6/2021 | Fahrbach ............... G02B 21/16 |
| 2021/0294085 A1 | 9/2021 | Dowaki |

FOREIGN PATENT DOCUMENTS

| | | |
|---|---|---|
| JP | 11-194275 | 7/1999 |
| JP | 2003-107361 A | 4/2003 |
| JP | 2003-130866 A | 5/2003 |
| JP | 2009-109933 A | 5/2009 |
| JP | 2009-282112 A | 12/2009 |
| JP | 2010-152367 A | 7/2010 |
| JP | 2012-078827 A | 4/2012 |
| JP | 2012-098366 A | 5/2012 |
| JP | 2013-190760 A | 9/2013 |
| JP | 2013-238797 A | 11/2013 |
| JP | 2014-112122 A | 6/2014 |
| JP | 2014-146542 A | 8/2014 |
| JP | 2015-200693 A | 11/2015 |
| JP | 2016-025316 A | 2/2016 |
| JP | 2017-156619 A | 9/2017 |
| WO | WO 2014/112212 A1 | 7/2014 |
| WO | WO 2014/119237 A1 | 8/2014 |

OTHER PUBLICATIONS

International Written Opinion dated Sep. 25, 2018 in connection with International Application No. PCT/JP2018/023180, and English translation thereof.
International Preliminary Report on Patentability dated Apr. 16, 2020 in connection with International Application No. PCT/JP2018/023180, and English translation thereof.
Extended European Search Report dated Oct. 13, 2020 in connection with European Application No. 18865061.8.
English Translation of the Chinese Office Action dated Jan. 6, 2022 in connection with Chinese Application No. 201880061772.2.
Wu, Metallographic Analysis Techniques Laboratory Tutorial. 2010:137-42.
International Search Report and English translation thereof dated Oct. 1, 2019 in connection with International Application No. PCT/JP2019/028557.
International Written Opinion dated Oct. 1, 2021 in connection with International Application No. PCT/JP2019/028557 and English translation thereof.
International Preliminary Report on Patentability dated Feb. 18, 2021 in connection with International Application No. PCT/JP2019/028557 and English translation thereof.
Extended European Search Report dated Aug. 9, 2021 in connection with European Application No. 19846152.7.
Křížek et al., Flexible structured illumination microscope with a programmable illumination array. Optics express. Oct. 22, 2012;20(22):24585-99.
Lin et al., Wide-field super-resolution optical sectioning microscopy using a single spatial light modulator. J. Opt. A: Pure Appl. Opt. 2009;11(015301):015301.
U.S. Appl. No. 17/264,270, filed Jan. 28, 2021, Dowaki.

* cited by examiner

A

B

C

FLUORESCENCE MICROSCOPE APPARATUS AND FLUORESCENCE MICROSCOPE SYSTEM

CROSS-REFERENCE TO RELATED APPLICATIONS

This application claims the benefit under 35 U.S.C. § 371 as a U.S. National Stage Entry of International Application No. PCT/JP2018/023180, filed in the Japanese Patent Office as a Receiving Office on Jun. 19, 2018, which claims priority to Japanese Patent Application Number JP2017-193116, filed in the Japanese Patent Office on Oct. 2, 2017, each of which is hereby incorporated by reference in its entirety.

TECHNICAL FIELD

The present technology relates to a fluorescence microscope apparatus and a fluorescence microscope system.

BACKGROUND ART

Fluorescence microscopes have been used to capture an image of a specimen such as a biological sample. The fluorescence microscopes are used by attaching a fluorescent substance to an observation target, exciting the observation target by illuminating it, for example, with laser light, and observing light emitted from the observation target when it returns from an excited state to a ground state. Well-known fluorescence microscopes are, for example, confocal fluorescence microscopes, laser scanning cytometers, and two-photon (multiphoton) excitation fluorescence microscopes.

In this connection, a technology disclosed, for example, in PTL 1 is used to build a confocal fluorescence microscope by disposing a DMD (Digital Micro-mirror Device) in an incoming/outgoing common optical path.

CITATION LIST

Patent Literature

[PTL 1]
Japanese Patent Laid-open No. Hei 11-194275

SUMMARY

Technical Problem

However, in a case where the prior art is used, it is difficult to capture an image of the observation target by illuminating it uniformly.

In view of the above circumstances, a main object of the present technology is to provide a technology that makes it possible to illuminate a specimen in a desired uniform illumination pattern and capture an image of a wide field of view in a low background illumination environment.

Solution to Problem

The present technology firstly provides a fluorescence microscope apparatus including: a first illumination optics that includes a first light source for exciting fluorescence in a specimen, a special light modulation element, and a first illumination optical member for uniformly illuminating the spatial light modulation element; a second illumination optics that includes a second illumination optical member for forming an image of a light beam from the spatial light modulation element on a specimen surface; and an imaging optics that includes an imaging optical member and an imaging element, the imaging optical member being adapted to capture an image of the specimen surface.

In the fluorescence microscope apparatus according to the present technology, the spatial light modulation element may be an LCOS (Liquid Crystal on Silicon). In this case, the first illumination optics may additionally include a polarization compensation element.

Further, in the fluorescence microscope apparatus according to the present technology, the first illumination optics may additionally include a speckle elimination element.

Furthermore, in the fluorescence microscope apparatus according to the present technology, the first illumination optics and the second illumination optics may illuminate light by switching between a plurality of lattice patterns.

Moreover, in the fluorescence microscope apparatus according to the present technology, the specimen may be dyed with a plurality of fluorescent dyes. In this case, the first illumination optics may include a plurality of the first light sources, and the plurality of the first light sources may excite the plurality of fluorescent dyes to emit light. Besides, in this case, the first illumination optics may control the intensity of illuminated light in accordance with luminance values of the plurality of fluorescent dyes. Further, in this case, the spatial light modulation element may divide an illumination region into a plurality of illumination regions in accordance with the shape of the specimen. Additionally, in this case, the plurality of illumination regions based on the plurality of the first light sources may be arranged in a Bayer array.

Further, the fluorescence microscope apparatus according to the present technology may additionally include a third illumination optics that includes a second light source and a third illumination optical member. The third illumination optical member uniformly illuminates the specimen surface.

Moreover, in the fluorescence microscope apparatus according to the present technology, the specimen may be a biological sample.

The present technology also provides a fluorescence microscope system including: a fluorescence microscope apparatus that includes a first illumination optics including a first light source exciting fluorescence in a specimen, a spatial light modulation element, and a first illumination optical member uniformly illuminating the spatial light modulation element, a second illumination optics including a second illumination optical member for forming an image of a light beam from the spatial light modulation element on a specimen surface, and an imaging optics including an imaging optical member being adapted to capture an image of the specimen surface and an imaging element; a spatial light modulation element control section that controls the spatial light modulation element; a captured-image acquisition section that acquires a captured image from the imaging optics; and an image processing section that processes a captured image acquired by the captured-image acquisition section.

In the fluorescence microscope system according to the present technology, the first illumination optics and the second illumination optics may illuminate light by switching between a plurality of lattice patterns, and the image processing section may obtain a high-resolution final image from a plurality of captured images acquired by the captured-image acquisition section.

Further, in the fluorescence microscope system according to the present technology, the specimen may be dyed with a plurality of fluorescent dyes.

Furthermore, in the fluorescence microscope system according to the present technology, the first illumination optics may include a plurality of the first light sources, the plurality of the first light sources may excite the plurality of fluorescent dyes to emit light, the spatial light modulation element may divide the illumination region into a plurality of illumination regions in accordance with the plurality of the first light sources, and the image processing section may obtain the luminance value of each fluorescent dye, as a reference, from a captured image acquired by the image acquisition section, and perform quantitative evaluation of fluorescence imaging. In this case, the quantitative evaluation of the fluorescence imaging may be compensation and/or unmixing.

Advantageous Effect of Invention

The present technology makes it possible to illuminate a specimen in a desired uniform illumination pattern and capture an image of a wide field of view in a low background illumination environment. It should be noted that the advantageous effect described here are not necessarily restrictive. The present technology may provide any advantageous effect described in the present disclosure.

DESCRIPTION OF EMBODIMENTS

Figure 1:
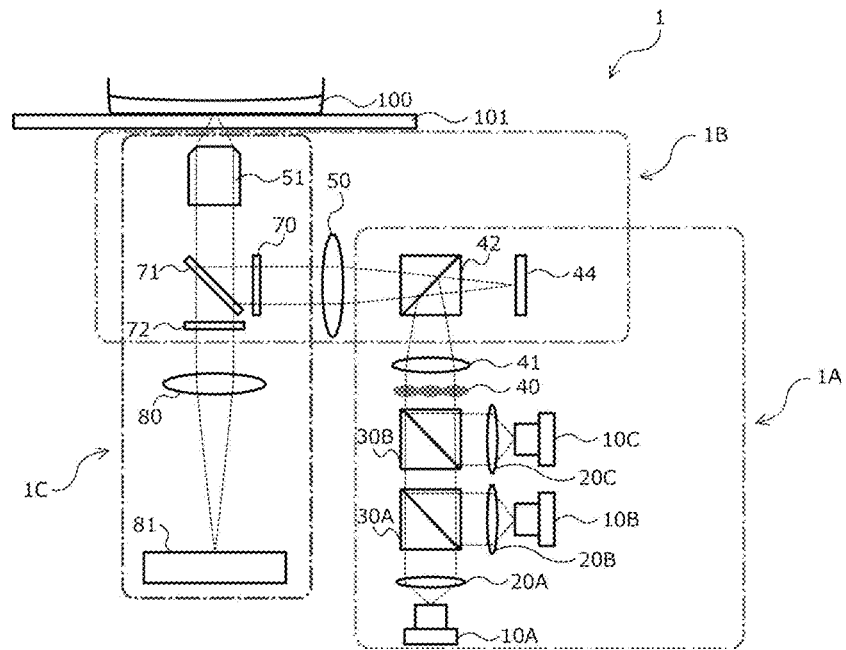
FIG. 1 is a configuration diagram illustrating an example of an overall configuration of a fluorescence microscope apparatus 1 according to a first embodiment of the present technology.

Preferred embodiments for implementing the present technology will now be described with reference to the accompanying drawings. The embodiments described below are examples of typical embodiments of the present technology so that the scope of the present technology is not narrowed in its interpretation by such embodiments. It should be noted that the description will be given in the following order.

1. Fluorescence Microscope Apparatus 1
1-1. First Embodiment
1-1-1. First Illumination Optics 1A
1-1-2. Second Illumination Optics 1B
1-1-3. Imaging Optics 1C
1-1-4. Advantageous Effect
1-2. Second Embodiment
1-3. Third Embodiment
1-4. Fourth Embodiment
1-4-1. Third Illumination Optics 1D
2. Fluorescence Microscope System 1000
2-1. Spatial Light Modulation Element Control Section
2-2. Captured-Image Acquisition Section 3
2-3. Image Processing Section 4
3. Application Examples
3-1. First Application Example (Application to SIM Super-Resolution)
3-2. Second Application Example (Application to Multiple Dye Excitation)
3-3. Third Application Example (Application to Bayer Excitation)
3-4. Fourth Application Example (Application to Quantitative Evaluation)
3-4-1. Example of Acquisition of Reference Luminance Value
3-4-2. Example of Fluorescence Correction (Compensation)
3-4-3. Example of Unmixing 1. Fluorescence Microscope Apparatus 1

A fluorescence microscope apparatus 1 according to the present technology includes a first illumination optics 1A, a second illumination optics 1B, and an imaging optics 1C. Further, the fluorescence microscope apparatus 1 according to the present technology may include, for example, other optics and other parts as needed.

A specimen 100 observed by using the fluorescence microscope apparatus 1 according to the present technology is not specifically limited. However, it is preferable that the specimen 100 be a biological sample obtained in vivo or in vitro, such as a biological tissue, a cell, or a liquid-derived sample. The biological sample may be, for example, a sample separated from humans and other mammals including a body fluid (e.g., blood, serum, blood plasma, urine, semen, cerebrospinal fluid, saliva, sweat, tears, ascitic fluid, or amniotic fluid), a cell, a tissue, an organ, and a diluted solution containing such a sample. Further, the specimen 100 applicable to the present technology is not limited to a specimen derived from mammals, and may be derived from a prokaryote or a eukaryote. Furthermore, the specimen 100 may be a slice of a biological sample including a tissue (e.g., a slice of an organ or tissue) or an extract from a biological sample (e.g., antigen, antibody, protein, or nucleic acid).

The specimen 100 applicable to the present technology may be dyed with a plurality of fluorescent dyes. Using the present technology makes it possible to capture images of a plurality of fluorescent dyes at substantially the same brightness level. Further, the present technology is capable of acquiring a fluorescence image depicting a plurality of fluorescent dyes by performing a single imaging operation. Furthermore, the present technology is also capable of acquiring accurate light emission information regarding each fluorescent dye by performing a single imaging operation. It should be noted that these advantageous effects will be described in detail later under "3. Application Examples."

The fluorescence microscope apparatus 1 according to the present technology will now be described in detail.

1-1. First Embodiment

FIG. 1 is a configuration diagram illustrating an example of an overall configuration of the fluorescence microscope apparatus 1 according to a first embodiment of the present technology. The fluorescence microscope apparatus 1 according to the present embodiment of the present technology includes the first illumination optics 1A, the second illumination optics 1B, and the imaging optics 1C. In FIGS. 1, 3, and 7 to 9, broken lines indicate optical paths.

Each of the above-mentioned optics will now be described in detail.

1-1-1. First Illumination Optics 1A

The first illumination optics 1A supplies a light beam for illuminating a spatial light modulation element 44 (illumination target surface). It should be noted that a certain optical element may be disposed as needed in a region through which the light of the first illumination optics 1A passes.

As illustrated in FIG. 1, the first illumination optics 1A includes, for example, first light sources 10 (10A, 10B, and 10C), the spatial light modulation element 44, and first illumination optical members (integrator 40 and condenser lens 41). The first light sources 10 excite fluorescence in a specimen. The first illumination optical members uniformly illuminate the spatial light modulation element 44.

Further, as illustrated in FIG. 1, the first illumination optics 1A may include coupling lenses (directivity angle conversion elements) 20 (20A, 20B, and 20C), optical path combination elements 30 (30A and 30B), and a polarization beam splitter 42.

The first light sources 10 are not specifically limited as far as they are capable of exciting fluorescence in a specimen. The first light sources 10 may be, for example, light sources capable of emitting laser light having a wavelength band that is able to function as excitation light during an intended fluorescence observation. However, it is preferable that an LD (Laser Diode) be used as the first light sources 10. The reason is that an LD emits high power linearly polarized light.

Further, a plurality of first light sources 10, namely, light source 10A, the light source 10B, and the light source 10C, are used in the present embodiment. However, the present technology requires the use of at least one first light source 10.

Furthermore, in a case where the specimen 100 is dyed with a plurality of fluorescent dyes as mentioned earlier, the first illumination optics 1A may include a plurality of first light sources 10, and the plurality of first light sources 10 (e.g., 10A, 10B, and 10C) may be adapted to emit light by exciting the plurality of fluorescent dyes. This enables each light source to emit laser light having a wavelength band corresponding to each fluorescent dye. As a result, different fluorescent dyes can be excited all at once to emit light. For example, in the present embodiment, the light sources 10A, 10B, and 10C are adapted to emit light having different wavelength bands and disposed in different optical paths.

Moreover, in a case where the first illumination optics 1A includes a plurality of first light sources 10, the plurality of first light sources 10 may be adapted to emit light having the same wavelength band. This results in increased excitation power.

As regards the first illumination optics 1A according to the present technology, in a case where the specimen 100 is dyed with a plurality of fluorescent dyes, the first illumination optics 1A includes a plurality of first light sources 10, and the plurality of first light sources 10 emit light by exciting the plurality of fluorescent dyes, a plurality of illumination regions based on the plurality of the first light sources 10 may be arranged in a Bayer array. It should be noted that this matter will be described in detail later under "3-3. Third Application Example (Application to Bayer Excitation)."

The spatial light modulation element 44 two-dimensionally modulates a light beam from the first illumination optics 1A in accordance with specimen illumination patterns corresponding to individual wavelength components of the light sources 10A, 10B, and 10C. The spatial light modulation element 44 includes a liquid crystal panel that uses, for example, a TN (Twisted Nematic) liquid crystal (liquid crystal molecules having positive refractive index anisotropy). More specifically, the spatial light modulation element 44 is structured such that a liquid crystal layer using a TN mode liquid crystal is sandwiched between a pair of substrates to which a drive voltage based on the specimen illumination patterns for a plurality of pixels arranged in a matrix is applied.

In a case where the above-mentioned TN liquid crystal is used, the spatial light modulation element 44 modulates light as described below depending on whether or not the drive voltage is applied.

Firstly, when the drive voltage is not applied (at the time of specimen illumination), the spatial light modulation element 44 imparts an in-plane phase difference to incident light by using a twisted orientation pattern, rotates a polarization axis approximately 90 degrees, and then emits light. That is, when the drive voltage is not applied, the spatial light modulation element 44 modulates light while reflecting the light in such a manner that polarized light (e.g., S-polarized light or P-polarized light) varies between incident light and outgoing light.

Meanwhile, when the drive voltage is applied (at the time of specimen non-illumination), the spatial light modulation element 44 orients all liquid crystal molecules in the thickness direction of the spatial light modulation element 44, imparts no in-plane phase difference to incident light, retains the polarization axis in its position, and then emits light. That is, when the drive voltage is applied, the spatial light modulation element 44 modulates light while reflecting the light in such a manner that polarized light (e.g., S-polarized light or P-polarized light) does not vary (remains unchanged) between incident light and outgoing light.

As described above, the polarization of specimen illumination light emitted from the spatial light modulation element 44 varies depending on whether or not the drive voltage is applied. Combining the above-described polarization properties of the spatial light modulation element 44 with later-described optical properties of the polarization beam splitter 42 enables the fluorescence microscope apparatus 1 to determine whether or not to illuminate the specimen 100 with illumination light.

It should be noted that the liquid crystal panel included in the spatial light modulation element 44 need not always use the aforementioned TN liquid crystal. Alternatively, the liquid crystal panel included in the spatial light modulation element 44 may use a different type of liquid crystal. More specifically, the liquid crystal panel included in the spatial light modulation element 44 may use, for example, a VA (Vertical Alignment) liquid crystal, an STN (Super Twisted Nematic) liquid crystal, an IPS (In Plane Switching) liquid crystal, an OCB (Optically Compensated Bend) liquid crystal, an MVA (Multidomain Vertical Alignment) liquid crystal, or an ASM (Axially Symmetric aligned Micro-cell) liquid crystal. Further, the liquid crystal panel included in the spatial light modulation element 44 may use a smectic liquid crystal (e.g., ferroelectric liquid crystal) instead of a nematic liquid crystal.

According to the present technology, it is preferable that the spatial light modulation element 44 be an LCOS (Liquid Crystal on Silicon) or a DMD (Digital Micro-mirror Device). The LCOS and the DMD have a high aperture ratio, and thus are able to illuminate the entire specimen 100.

Further, as regards the first illumination optics 1A according to the present technology, in a case where the specimen 100 is dyed with a plurality of fluorescent dyes, the first illumination optics 1A includes a plurality of first light sources 10, and the plurality of first light sources 10 emit light by exciting the plurality of fluorescent dyes, the illumination region can be divided into a plurality of illumination regions in accordance with the plurality of first light sources 10. It should be noted that this matter will be described in detail later under "3-4. Fourth Application Example (Application to Quantitative Evaluation)."

Moreover, it is particularly preferable that the LCOS be used as the spatial light modulation element 44. When the DMD is turned off during its use as the spatial light modulation element 44, light is likely to scatter and stray. This may result in increased background illumination during a fluorescence observation.

According to the present technology, it is preferable that the intensity of light be adjusted by the spatial light modulation element 44 in order to maintain the independence of the exposure time of an imaging element. However, the intensity of light may alternatively be adjusted by the pulse width and output of the first light sources 10.

The integrator 40 illuminates the spatial light modulation element 44 by using a uniform intensity distribution. It should be noted that the integrator 40 in the present embodiment includes one fly's eye lens. Alternatively, however, the integrator 40 may include a pair of fly's eye lens.

The integrator 40 includes a plurality of lenses arranged, for example, in a predetermined array (e.g., in a matrix). In general, a light beam emitted from the first light sources 10 has a non-uniform intensity distribution (luminance distribution) in a plane perpendicular to the direction of the light beam. Therefore, when the light beam is directly guided to the spatial light modulation element 44, the intensity distribution in the spatial light modulation element 44 is not uniform. However, when the light beam emitted from the first light sources 10 is divided into a plurality of light beams by the integrator 40 and individually guided to the spatial light modulation element 44 in a superimposed manner, the intensity distribution in the spatial light modulation element 44 becomes uniform (by reducing the non-uniformity of illuminance distribution).

The condenser lens 41 guides a light beam divided into a plurality of light beams by the integrator 40 to the spatial light modulation element 44 in a superimposed manner. The condenser lens 41 may have any appropriate configuration.

Figure 2:
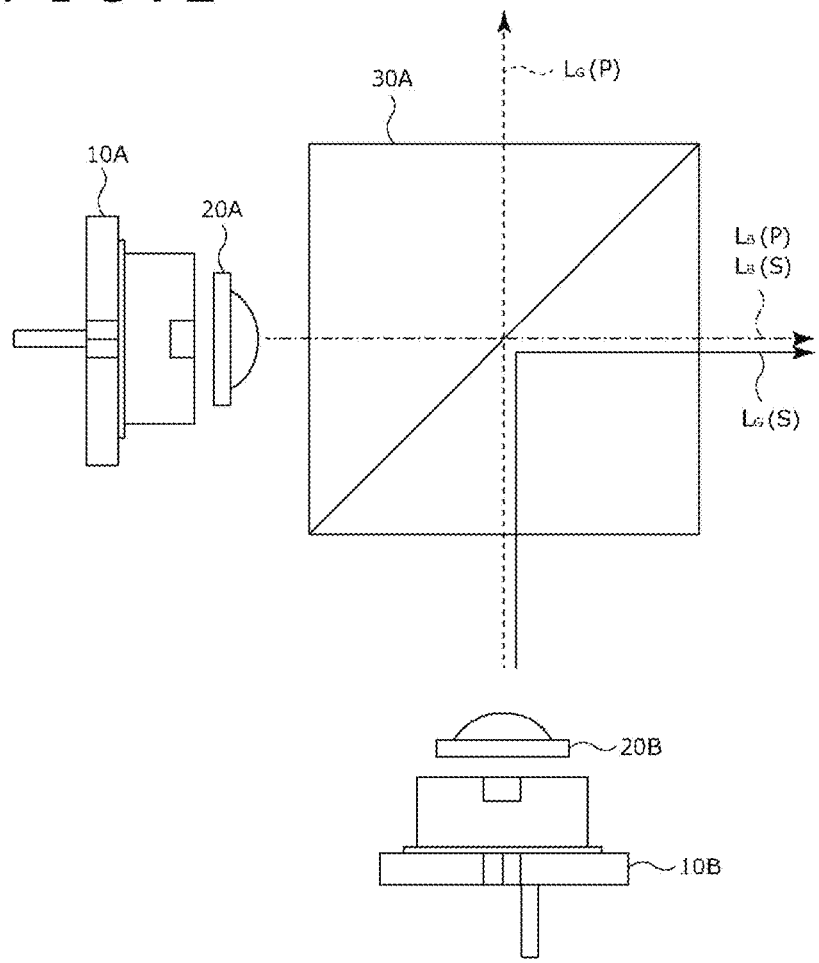
FIG. 2 is a diagram illustrating a configuration and example operation of a first optical path combination element 30A.

The optical path combination elements 30 combine light emitted from the light sources 10A, 10B, and 10C. In the present embodiment, the optical path combination elements 30 include a first optical path combination element 30A and a second optical path combination element 30B. In the present embodiment, as described later, the optical properties of the first optical path combination element 30A are such that, when optical paths are to be combined as depicted in FIG. 2 with respect to light having a predetermined wavelength band (e.g., green light LG), a first polarized component (e.g., S-polarized component) is guided to a predetermined optical path while a second polarized component (e.g., P-polarized component) is guided in a direction away from the predetermined optical path.

On the optical axis of the light source 10A, the coupling lens 20A, the first optical path combination element 30A, the integrator 40, and the condenser lens 41 are sequentially disposed from the light source 10A in the order named. The optical axis of the light source 10B is orthogonal to the optical axis of the light source 10A in the first optical path combination element 30A. On the optical axis of the light source 10B, the coupling lens 20B and the first optical path combination element 30A are sequentially disposed from the light source 10B in the order named. The optical axis of the light source 10C is orthogonal to the optical axis of the light source 10A in the second optical path combination element 30B. On the optical axis of the light source 10C, the coupling lens 20C and the second optical path combination element 30B are sequentially disposed from the light source 10C in the order named.

As depicted in FIG. 1, the coupling lens 20A substantially parallelizes the light emitted, for example, from the light source 10A, and performs conversion such that the directivity angle of the light emitted from the light source 10A is equal or close to the directivity angle of the parallelized light. The coupling lens 20A is disposed at a position where the light emitted from the light source 10A that is within the directivity angle is incident. The coupling lens 20B substantially parallelizes the light emitted, for example, from the light source 10B as depicted in FIG. 1, and performs conversion such that the directivity angle of the light emitted from the light source 10B is equal or close to the directivity angle of the parallelized light. The coupling lens 20B is disposed at a position where the light emitted from the light source 10B that is within the directivity angle is incident. The coupling lens 20C substantially parallelizes the light emitted, for example, from the light source 100 as depicted in FIG. 1, and performs conversion such that the directivity angle of the light emitted from the light source 100 is equal or close to the directivity angle of the parallelized light. The coupling lens 20C is disposed at a position where the light emitted from the light source 100 that is within the directivity angle is incident.

Stated differently, the coupling lenses 20A, 20B, and 20C are disposed respectively on a one-to-one basis for the light sources 10A, 10B, and 10C (for individual packages). It should be noted that the coupling lenses 20A, 20B, and 20C may each include a single lens or a plurality of lenses.

The first optical path combination element 30A and the second optical path combination element 30B each include a mirror that is wavelength-selective. It should be noted that the mirror is formed by depositing multilayer interference films. For example, a dichroic prism may be used as the mirror. As depicted in FIG. 1, the first optical path combination element 30A transmits, for example, light incident from the back side of the mirror (light incident from a side toward the light source 10A) to the front side of the mirror, and causes the mirror to reflect part of light incident from the front side of the mirror (light incident from the light source 10B). Meanwhile, as depicted in FIG. 1, the second optical path combination element 30B transmits, for example, light incident from the back side of the mirror (light of the light sources 10A and 10B that is incident from a side toward the first optical path combination element 30A) to the front side of the mirror, and causes the mirror to reflect light incident from the front side of the mirror (light incident from a side toward the light source 10C). Therefore, the optical path combination elements 30 obtains a single light beam by combining individual light beams emitted from the light sources 10A, 10B, and 10C.

The polarization beam splitter 42 is a polarization separation element that transmits, to a predetermined illumination position, a predetermined polarized component included in light directed to a predetermined optical path, and combines the first illumination optics 1A with the later-described second illumination optics 1B. For example, prism coated with a multilayer film are stuck together to form the polarization beam splitter 42. The polarization separation element may be an element having polarization properties (e.g., wire grid or polarizing film) or a beam splitter obtained substantially by sandwiching such an element between prisms.

The polarization beam splitter 42 is an optical member that selectively transmits specific polarized light (e.g., P-polarized light) and selectively reflects the other polarized light (e.g., S-polarized light). Therefore, incident light (e.g., S-polarized light) is selectively reflected from the polarization beam splitter 42 and incident on the spatial light modulation element 44.

According to the present technology, in a case where the specimen 100 is dyed with a plurality of fluorescent dyes, the first illumination optics 1A is able to control the intensity of illuminated light in accordance with luminance values of the plurality of fluorescent dyes. It should be noted that this matter will be described in detail later under "3-2. Second Application Example (Application to Multiple Dye Excitation)."

Further, the spatial light modulation element 44 is able to divide an illumination region into a plurality of illumination regions in accordance with the shape of the specimen 100. The shape of the specimen 100 can be determined, for example, by using a later-described third illumination optics 1D. It should be noted that this matter will be described in detail later under "3-2. Second Application Example (Application to Multiple Dye Excitation)."

1-1-2. Second Illumination Optics 1B

The second illumination optics 1B forms an image of a light beam from the spatial light modulation element 44 on a specimen surface. As the spatial light modulation element 44 is uniformly illuminated in the first illumination optics 1A, the second illumination optics 1B is able to uniformly illuminate the specimen. Additionally, as the specimen surface has a conjugate relationship with the spatial light modulation element 44, the specimen can be excited in any appropriate pattern. It should be noted that a certain optical element may be disposed as needed in a region through which the light of the second illumination optics 1B passes.

As depicted in FIG. 1, the second illumination optics 1B includes, for example, a second illumination optical member (including a condenser lens 50 and an objective lens 51) that forms an image of a light beam from the spatial light modulation element 44 on a specimen surface.

Further, as depicted in FIG. 1, the second illumination optics 1B may additionally include a bandpass filter 70 and a dichroic mirror 71 as the second illumination optical member.

The condenser lens 50 couples a uniform light beam from the spatial light modulation element 44. The condenser lens 50 may have any appropriate configuration.

The objective lens 51 forms, on a specimen surface, an image of the light beam coupled by the condenser lens 50. The objective lens 51 is not specifically limited and may have any appropriate configuration. A plurality of the objective lenses 51 may be included and used respectively for purposes, for example, of bright-field observation, phase difference observation, and fluorescence observation. Further, for example, the number of apertures, magnification, and working distance of the objective lens 51 are not specifically limited.

The bandpass filter 70 obtains a wavelength band necessary for fluorescence excitation from the first light sources 10 (10A, 10B, and 10C). The bandpass filter 70 is not specifically limited and may have any appropriate configuration. For example, the central wavelength and bandwidth of the bandpass filter 70 are not specifically limited.

The dichroic mirror 71 separates excitation light from fluorescence by reflecting light having a specific wavelength band and transmits the other light, and combines the second illumination optics 1B with the later-described imaging optics 1C. The dichroic mirror 71 may have any appropriate configuration.

When the combination of the bandpass filter 70 and dichroic mirror 71 is used in the present embodiment, for example, the bandpass filter 70 may obtain only the wavelength band of the light source 10A and let the dichroic mirror 71 reflect that wavelength band only. An alternative is to let the bandpass filter 70 obtain the three wavelength bands of the light sources 10A, 10B, and 10C and let the dichroic mirror 71 reflect the three wavelength bands. In the former situation, it is possible to observe fluorescence having a relatively wide wavelength band. However, in a case where the first light sources 10 having a plurality of different wavelengths, the combination needs to be changed. Meanwhile, in the latter situation, the observable wavelength band is narrowed due to the design of the bandpass filter 70 and dichroic mirror 71. However, a plurality of fluorescence observations can be made at the same time.

Further, the present technology allows the first illumination optics 1A and the second illumination optics 2B to illuminate light by switching between a plurality of lattice patterns. It should be noted that this matter will be described in detail later under "3-1. First Application Example (Application to SIM Super-Resolution)."

1-1-3. Imaging Optics 10

The imaging optics 10 captures an image of the specimen surface. The imaging optics 10 makes it possible to capture a fluorescence image of the specimen excited by the first illumination optics 1A and the second illumination optics 1B and capture, for example, a bright-field image or phase-difference image that is obtained by illumination provided by the later-described third illumination optics 1D. It should be noted that a certain optical element may be disposed as needed in a region through which the light of the imaging optics 10 passes.

As depicted in FIG. 1, the imaging optics 10 includes an imaging optical member (including the objective lens 51 and an image-forming lens 80) and an imaging element 81. The imaging optical member captures an image of the specimen surface.

Further, as depicted in FIG. 1, the imaging optics 10 may additionally include a bandpass filter 72 as the imaging optical member.

In the imaging optics 10, the objective lens 51 condenses a light beam coming from the specimen surface including the specimen 100 on a stage 101. According to the present technology, the objective lens 51 is shared by the aforementioned second illumination optics and the imaging optics 1C.

The image-forming lens 80 forms an image of the light beam condensed by the objective lens 51 on the imaging element 81. The image-forming lens 80 may have any appropriate configuration.

As mentioned above, the objective lens 51 is shared by the second illumination optics 1B and the imaging optics 1C. Therefore, the magnification ratio of the objective lens 51 can be determined, for example, by the ratio between the focal length of the condenser lens 50 and the focal length of the image-forming lens 80. Accordingly, the magnification ratio of the objective lens 51 is based on the pixel sizes of the spatial light modulation element 44 and imaging element 81 or on the device sizes of the spatial light modulation element 44 and imaging element 81 that are determined by multiplying the pixel size by the number of pixels.

More specifically, in a case where, for example, the spatial light modulation element 44 is an LCOS, the pixel sizes of the LCOS and imaging element 81 are 6 μm and 3 μm, respectively, and the sizes of pixels projected onto the specimen surface are to be uniformed (=1:1), the ratio between the focal length of the condenser lens 50 and the focal length of the image-forming lens 80 should be set to 2:1. Further, in a case where the ratio between the sizes of pixels projected onto the specimen surface is to be 4:1, the ratio between the focal length of the condenser lens 50 and the focal length of the image-forming lens 80 should be set to 1:2. Moreover, in a case where the pixel sizes of the LCOS and imaging element 81 are 6 μm and 3 μm, respectively, the LCOS and the imaging element 81 have 2,000× 1,000 pixels and 4,000×2,000 pixels, respectively, and the device sizes projected onto the specimen surface are to be uniformed, the ratio between the focal length of the condenser lens 50 and the focal length of the image-forming lens 80 should be set to 1:1.

The imaging element 81 may be, for example, a CCD (Charge Coupled Device) image sensor or a CMOS (Complementary Metal Oxide Semiconductor) image sensor. The imaging element 81 includes, for example, a photoelectric conversion element for receiving light of RGB (Red, Green, Blue) colors on an individual color basis and converting the received light to an electrical signal, and obtains a color image from incident light. Further, the imaging element 81 may have a 4-channel configuration, that is, an RGBI (Red, Green, Blue, Infrared rays) channel configuration, for receiving light of a near-infrared wavelength region in addition to the light of RGB.

The bandpass filter 72 obtains a fluorescence wavelength band from the specimen 100. The bandpass filter 72 is not specifically limited and may have any appropriate configuration. For example, the central wavelength and bandwidth of the bandpass filter 72 are not specifically limited.

In the present embodiment, the bandpass filter 72 may obtain only a fluorescence wavelength band excited by the light source 10A or obtain three fluorescence wavelength bands excited by the light sources 10A, 10B, and 10C, as is the case with the combination of the bandpass filter 70 and dichroic mirror 71 in the second illumination optics 1B. In the former situation, it is possible to observe fluorescence having a relatively wide wavelength band (LPF (Long Pass Filter)). However, in a case where the first light sources 10 having a plurality of different wavelengths, an appropriate change needs to be made. Meanwhile, in the latter situation, the observable fluorescence wavelength band is narrowed due to the design of the bandpass filter 72. However, a plurality of fluorescence observations can be made at the same time.

It should be noted that the stage 101 depicted in FIGS. 1, 3, and 7 to 9, is not necessarily included in the fluorescence microscope apparatus 1 according to the present technology. However, the stage 101 may be allowed, for example, to move in an XY direction orthogonal to the optical axis of the objective lens 51 and in a Z direction along the optical axis.

1-1-4. Advantageous Effect

The present embodiment makes it possible to enable the first illumination optics 1A and the second illumination optics 1B to provide illumination in a desired pattern obtained by subjecting uniform illumination to spatial light modulation, and capture an image in a low background illumination environment.

1-2. Second Embodiment

Figure 3:
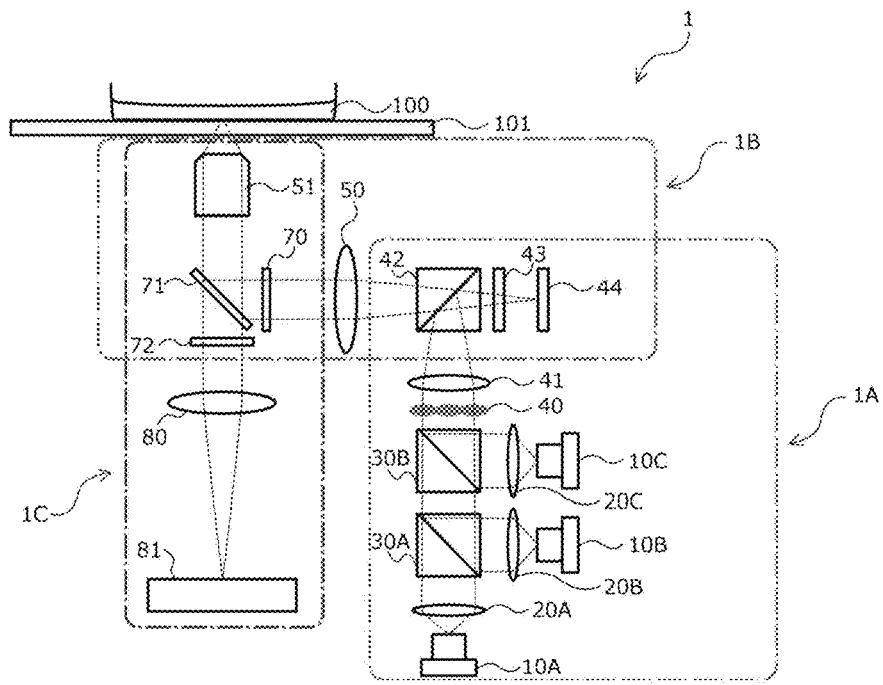
FIG. 3 is a configuration diagram illustrating an example of an overall configuration of the fluorescence microscope apparatus 1 according to a second embodiment of the present technology.

FIG. 3 is a configuration diagram illustrating an example of an overall configuration of the fluorescence microscope apparatus 1 according to a second embodiment of the present technology. In the second embodiment, the first illumination optics 1A additionally includes a polarization compensation element 43. It should be noted that the other elements in the second embodiment are similar to the corresponding elements described in "1-1. First Embodiment" and will not be redundantly described.

In a case where the spatial light modulation element 44 is an LCOS, the first illumination optics 1A includes the polarization compensation element 43, and thus makes it possible to further reduce the background illumination.

Specifically, the polarization compensation element 43 is disposed in an optical path between the polarization beam splitter 42 and the spatial light modulation element 44, and adapted to vary the polarization of incident light by imparting a phase difference to it. More specifically, firstly, the polarization compensation element 43 has a first surface (a light passage surface on a side toward the polarization beam splitter 42) and a second surface (a light passage surface on a side toward the spatial light modulation element 44). Additionally, the polarization compensation element 43 imparts a phase difference having opposite polarities (opposite directions) and substantially equal absolute values when light is incident from a side toward the polarization beam splitter 42 (from the first surface) (incident direction d1) and when light is incident from a side toward the spatial light modulation element 44 (from the second surface) (incident direction d2). That is, the polarization compensation element 43 has phase difference characteristics (phase difference symmetry) independent of the direction of incident light. Accordingly, the light leakage to the specimen surface at the time of specimen non-illumination is reduced to suppress an increase in the background illumination by the total sum of three phase differences, namely, the phase difference imparted when light is incident from a side toward the polarization beam splitter 42 in the polarization compensation element 43, the phase difference caused when light is modulated in the spatial light modulation element 44, and the phase difference imparted when light is incident from a side toward the spatial light modulation element 44 in the polarization compensation element 43.

In the fluorescence microscope apparatus 1 according to the second embodiment, light emitted from the light sources 10A, 10B, and 10C in the first illumination optics 1A is polarization-separated by the polarization beam splitter 42, and one of such polarization-separated beams of light (e.g., S-polarized light) is incident on the spatial light modulation element 44 through the polarization compensation element 43. Further, the incident light is modulated by the spatial light modulation element 44 in accordance with a specimen illumination pattern, and then incident on the second illumination optics 1B through the polarization compensation element 43 and the polarization beam splitter 42.

Here, when a specimen is to be illuminated in accordance with a specimen illumination pattern, for example, P-polarized light L1p of the light incident on the polarization beam splitter 42 from the first illumination optics 1A is directly transmitted through a polarization separation plane, whereas, for example, S-polarized light L1s is reflected from the polarization separation plane and then incident on the spatial light modulation element 44. Here, specimen illumination light modulated in the spatial light modulation element 44, reflected, and then incident is converted to P-polarized light (P-polarized light L2p). Accordingly, the P-polarized light L2p is transmitted through the polarization separation plane of the polarization beam splitter 42 and directed toward the second illumination optics 1B in order to provide illumination in a specimen illumination pattern.

Meanwhile, when a specimen is not to be illuminated in accordance with a specimen illumination pattern, first of all, as is the case with the aforementioned specimen illumination, for example, the P-polarized light Lip is transmitted through the polarization separation plane, whereas, for example, the S-polarized light L1s is reflected from the polarization separation plane and then incident on the spatial light modulation element 44. Here, the specimen illumination light modulated in the spatial light modulation element 44, reflected, and then emitted is retained as S-polarized light (S-polarized light L2s) without being converted. Accordingly, the S-polarized light L2s is reflected from the polarization separation plane of the polarization beam splitter 42 and returned toward the first illumination optics 1A. That is, the specimen illumination light is not directed toward the second illumination optics 1B in this case. Therefore, illumination in a specimen illumination pattern is not provided.

In the case of such specimen non-illumination, light leakage Lleak may occur in the spatial light modulation element 44 from the polarization beam splitter 42 toward the second illumination optics 1B. As mentioned earlier, the specimen illumination light generated in the spatial light modulation element 44 at the time of specimen non-illumination is S-polarized light (S-polarized light L2s). Therefore, the entire light is reflected from the polarization beam splitter 42. Consequently, no light leakage Lleak is supposed to occur toward the second illumination optics 1B.

However, for example, the S-polarized light L1s is light condensed by the condenser lens 41. Therefore, the S-polarized light L1s includes a light component that is obliquely incident on an incident surface Sin of the polarization beam splitter 42. Thus, the specimen illumination light (S-polarized light L2s), that is, the reflection of the S-polarized light L1s, incurs light leakage Lleak as described below. More specifically, such oblique incident light looks like a polarized component that is rotated from an ideal S-polarization axis with respect the polarization separation plane, and the specimen illumination light actually includes an elliptically-polarized component. Consequently, as the elliptically-polarized component is included, part of the specimen illumination light is transmitted through the polarization separation plane without being reflected. This causes light leakage Lleak. When such light leakage Lleak occurs, the specimen illumination light is partly projected onto the specimen surface even at the time of specimen non-illumination. This results in increased background illumination.

In the fluorescence microscope apparatus 1 according to the present embodiment, the polarization compensation element 43 imparts a phase difference having opposite polarities (opposite directions) and substantially equal absolute values when light is incident from a side toward the polarization beam splitter 42 (incident direction d1) and when light is incident from a side toward the spatial light modulation element 44 (incident direction d2). That is, the polarization compensation element 43 has phase difference characteristics (phase difference symmetry) independent of the direction of incident light. Accordingly, the light leakage Lleak toward the second illumination optics 1B at the time of specimen non-illumination is reduced by the total sum of three phase differences, namely, the phase difference imparted when light is incident from a side toward the polarization beam splitter 42 in the polarization compensation element 43, the phase difference caused when light is modulated in the spatial light modulation element 44, and the phase difference imparted when light is incident from a side toward the spatial light modulation element 44 in the polarization compensation element 43.

Figure 4:
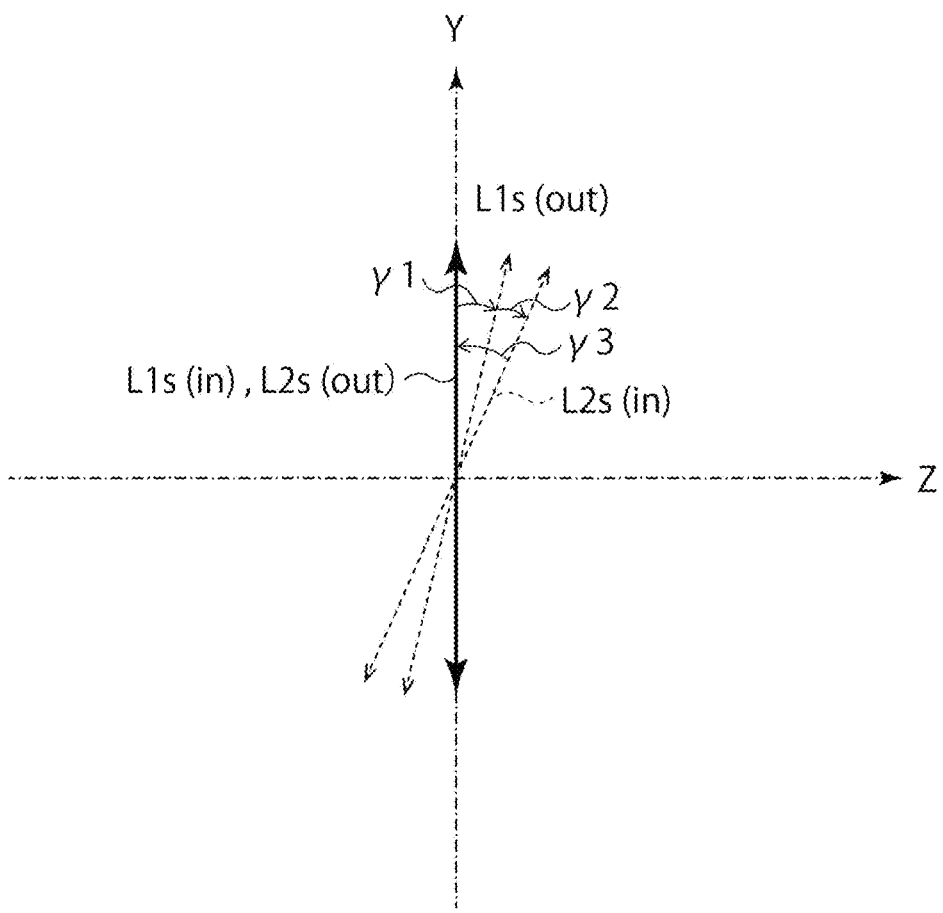
FIG. 4 is a diagram illustrating an operation of a polarization compensation element 43 with respect to an S-polarized component.

Reduction of light leakage Lleak by the aforementioned total sum of the phase differences at the time of specimen non-illumination will now be described in detail by using, for example, a schematic diagram in FIG. 4 (this diagram schematically depicts polarization state changes by paying attention to a certain light ray). First of all, when S-polarized light (S-polarized light L1s (in)) is incident on the polarization compensation element 43 from the polarization beam splitter 42, a phase difference indicated by a rotation direction γ1 in FIG. 4 is imparted in the polarization compensation element 43 to emit S-polarized light L1s (out). Next, when the S-polarized light L1s (out) emitted from the polarization compensation element 43 is modulated in the spatial light modulation element 44 and reflected, a slight phase difference (see a rotation direction γ2 in FIG. 4) is imparted to generate specimen illumination light (S-polarized light L2s (in)). Subsequently, when the specimen illumination light (S-polarized light L2s (in)) is incident again on the polarization compensation element 43, a phase difference indicated by a rotation direction γ3 is imparted. The rotation direction γ3 is opposite the aforementioned rotation directions γ1 and γ2 (opposite polarities). When attention is paid to a certain light ray as described above, the specimen illumination light (S-polarized light L2s (out)) emitted from the polarization compensation element 43 is converted to linearly polarized light having the same polarization axis as the original S-polarized light L1s (in). Therefore, when incident on the polarization beam splitter 42, the specimen illumination light (S-polarized light L2s (out)) is entirely reflected from the polarization separation plane and returned to the first illumination optics 1A. This reduces or prevents the light leakage Lleak toward the second illumination optics 1B.

Figure 5:
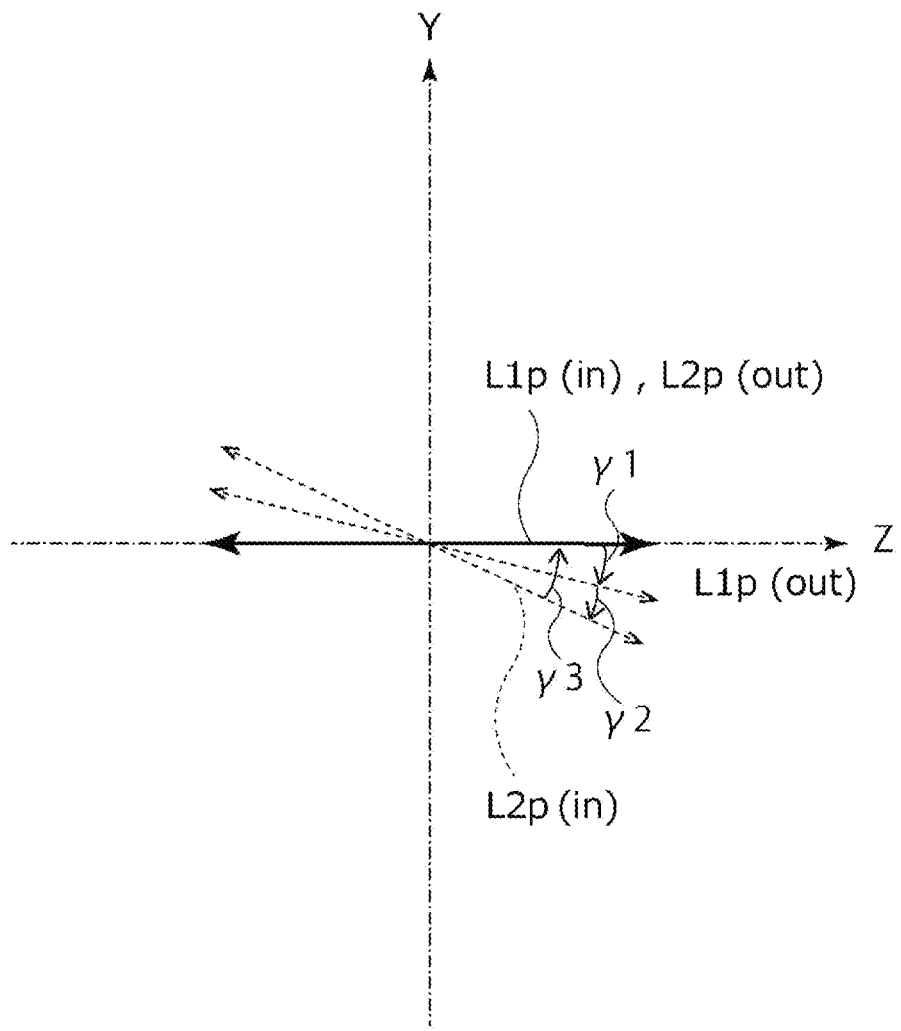
FIG. 5 is a diagram illustrating an operation of the polarization compensation element 43 with respect to a P-polarized component.

As mentioned earlier, if a polarization ratio (the ratio of S-polarized light/P-polarized light) of light incident on the polarization compensation element 43 is poor in a case where the polarization compensation element 43 is inserted between the polarization beam splitter 42 and the spatial light modulation element 44, the background illumination increases. As depicted in FIG. 5, the polarization compensation element 43 performs the same action on P-polarized light and S-polarized light (see FIG. 4). That is, when the P-polarized light Lip (in) is incident on the polarization compensation element 43 from the polarization beam splitter 42, the polarization compensation element 43 imparts a phase difference indicated, for example, by the depicted rotation direction γ1 and emits the P-polarized light Lip (out). Next, when the P-polarized light Lip (out) emitted from the polarization compensation element 43 is modulated in the spatial light modulation element 44 and reflected, a slight phase difference (see the depicted rotation direction γ2) is imparted to generate the P-polarized light L2p (in). Subsequently, when the P-polarized light L2p (in) is incident again on the polarization compensation element 43, a phase difference indicated by the rotation direction γ3 is imparted. The rotation direction γ3 is opposite the aforementioned rotation directions γ1 and γ2 (opposite polarities). When attention is paid to a certain light ray as described above, the light (P-polarized light L2p (out)) emitted from the polarization compensation element 43 is converted to linearly polarized light having the same polarization axis as the original P-polarized light L1p (in).

Figure 6:
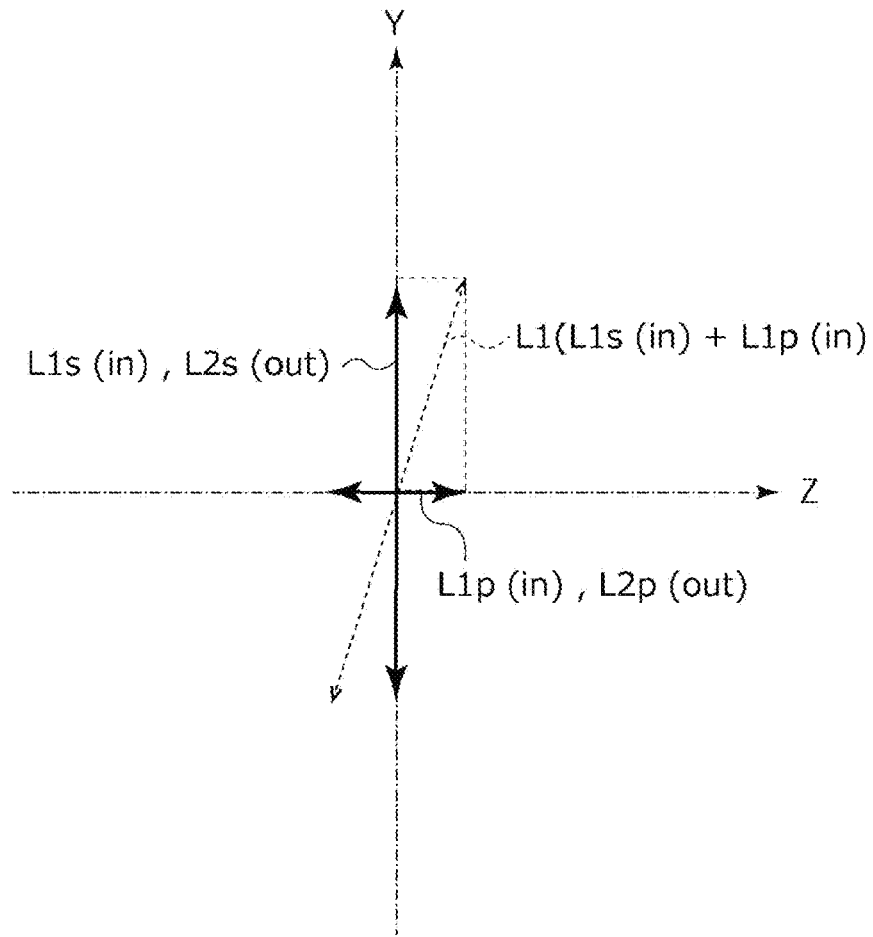
FIG. 6 is a diagram illustrating a state of light in a case where a polarization ratio is poor due to a mix of an S-polarized component and a P-polarized component.

As described above, the polarization compensation element 43 acts on both P-polarized light and S-polarized light. Therefore, when incident light L1 incident on the polarization compensation element 43 from the polarization beam splitter 42 includes not only the S-polarized light L1s (in) but also the P-polarized light L1p (in) as depicted, for example, in FIG. 6, the light returning to the polarization beam splitter 42 also includes not only the S-polarized light L2s (out) but also the P-polarized light L2p (out). This causes an increase in the background illumination.

Further, when a laser providing a high polarization ratio is used as the light sources 10A, 10B, and 100, a high polarization is obtained without inserting, for example, a polarizing plate. This is extremely effective for reducing the background illumination by using the polarization compensation element 43. However, a light component oriented in an unnecessary polarization direction is generally included in light emitted from a laser light source providing a high polarization ratio. Therefore, using a laser light source does not achieve a sufficient effect of background illumination reduction.

In view of the above circumstances, it is preferable, for example, that the first optical path combination element 30A have properties described below. In short, it is preferable that the first optical path combination element 30A have such optical properties that, when optical paths are to be combined, the first polarized component is guided to a predetermined optical path (an optical path to the polarization beam splitter 42 and the spatial light modulation element 44) with respect to light in a predetermined wavelength band while the second polarized component is guided in a direction away from the predetermined optical path.

More specifically, as depicted, for example, in FIG. 2, it is preferable the first optical path combination element 30A have such polarization properties as to reflect the first polarized component (an S-polarized component LG (S)) with respect to light in a first wavelength band (green light LG), which is the light in the predetermined wavelength band, and transmit the second polarized component (a P-polarized component LG (P)). Further, it is preferable that the first optical path combination element 30A have such properties as to transmit components of light (blue light LB) in a second wavelength band (an S-polarized component LB (S) and a P-polarized component LB (P)).

Stated differently, when combining optical paths, the first optical path combination element 30A guides the S-polarized component LG (S) of green light LG to the polarization beam splitter 42 and does not guide the P-polarized component LG (P) to the polarization beam splitter 42. The polarization beam splitter 42 has such properties as to reflect the S-polarized light and transmit the P-polarized light. However, the polarization beam splitter 42 has such properties as to slightly reflect the P-polarized light. Therefore, when the polarization ratio of incident light (the ratio of S-polarized light/P-polarized light) is poor, S-polarized and P-polarized light components are both guided to the spatial light modulation element 44. However, the first optical path combination element 30A does not direct the P-polarized light to the polarization beam splitter 42 (directs the P-polarized light to an unnecessary optical path) at least with respect to the green light LG. Thus, light having a high polarization ratio (light substantially including only S-polarized light) is incident on the polarization beam splitter 42. As a result, only the S-polarized light is substantially directed to the spatial light modulation element 44 at least with respect to the green light LG.

At the time of specimen non-illumination, polarized light incident on the spatial light modulation element 44 is emitted as is without being subjected to a phase change. Therefore, if P-polarized component is included in light incident on the spatial light modulation element 44, the P-polarized component emitted from the spatial light modulation element 44 is transmitted through the polarization beam splitter 42 as leaked light. According to the present embodiment, at least with respect to the green light LG, light incident on the spatial light modulation element 44 substantially includes only the S-polarized component. Thus, at the time of specimen non-illumination, polarized light emitted from the spatial light modulation element 44 substantially includes only the S-polarized light. This decreases the light leakage and reduces the background illumination. The above-described effect is similarly obtained even when the polarization compensation element 43 is not used.

1-3. Third Embodiment

Figure 7:
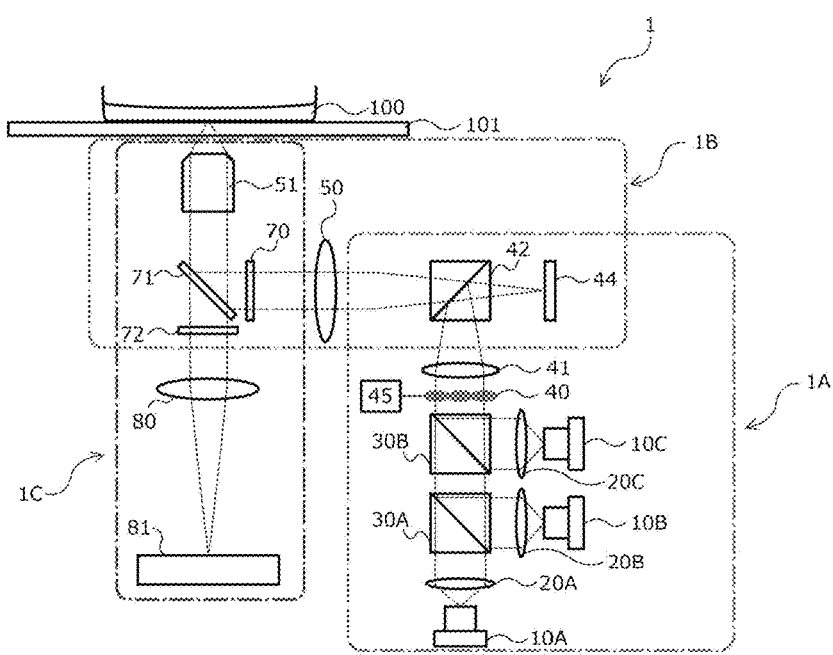
FIG. 7 is a configuration diagram illustrating an example of an overall configuration of the fluorescence microscope apparatus 1 according to a third embodiment of the present technology.

FIG. 7 is a configuration diagram illustrating an example of an overall configuration of the fluorescence microscope apparatus 1 according to a third embodiment of the present technology. In the third embodiment, the first illumination optics additionally includes a speckle elimination element 45. It should be noted that the other elements in the third embodiment are similar to the corresponding elements described in "1-1. First Embodiment" and will not be redundantly described.

The first illumination optics 1A includes the speckle elimination element 45 and is able to eliminate speckles by vibrating the integrator 40. This makes it possible to improve the uniformity of illumination light intensity distribution.

1-4. Fourth Embodiment

Figure 8:
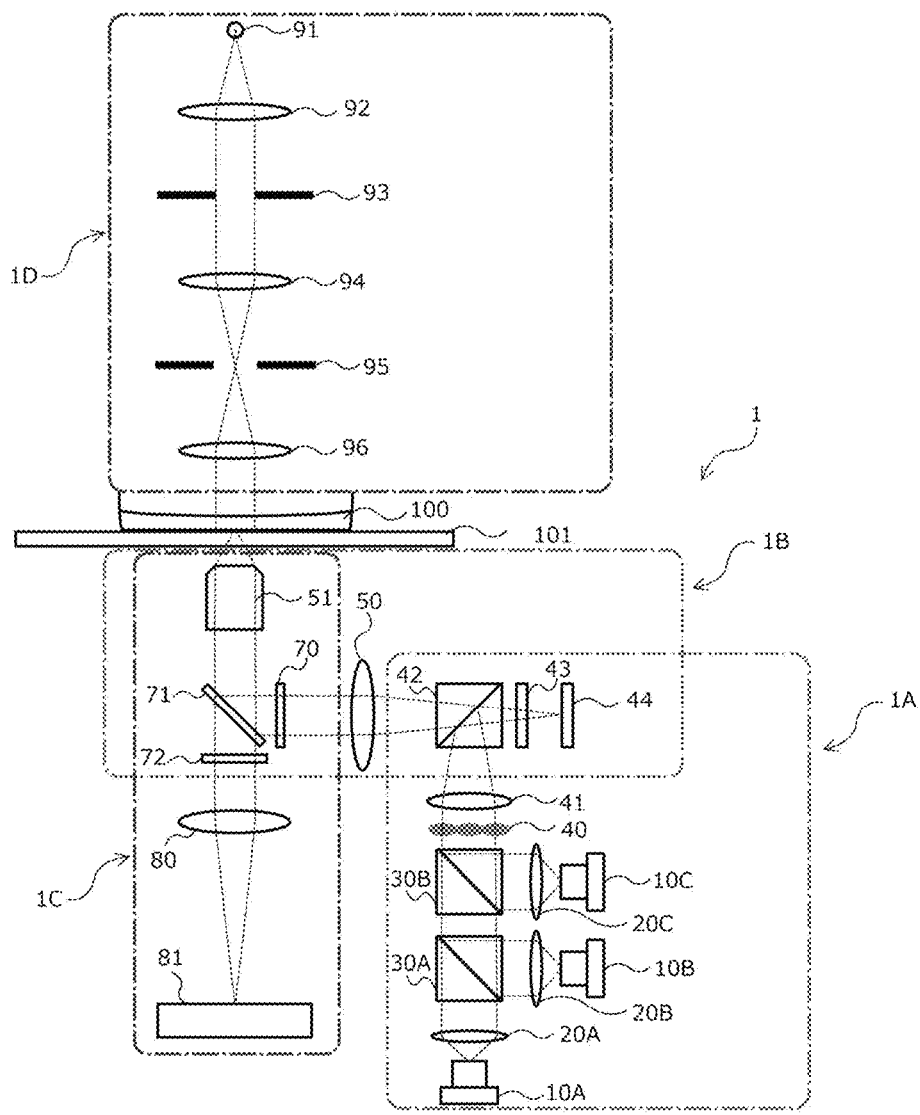
FIG. 8 is a configuration diagram illustrating an example of an overall configuration of the fluorescence microscope apparatus 1 according to a fourth embodiment of the present technology.

FIG. 8 is a configuration diagram illustrating an example of an overall configuration of the fluorescence microscope apparatus 1 according to a fourth embodiment of the present technology. The fluorescence microscope apparatus 1 according to the fourth embodiment additionally includes the third illumination optics 1D. It should be noted that the other elements in the fourth embodiment are similar to the corresponding elements described in "1-1. First Embodiment" and will not be redundantly described.

The third illumination optics 1D will now be described in detail.

1-4-1. Third Illumination Optics 1D

The third illumination optics 1D uniformly illuminates the specimen surface. It should be noted that a certain optical element may be disposed as needed in a region through which the light of the third illumination optics 1D passes.

As depicted in FIG. 8, the third illumination optics 1D includes, for example, a second light source 91 and illumination optical members (a light source lens 92, a field stop 93, a relay lens 94, an aperture stop 95, and a condenser lens 96). The illumination optical members uniformly illuminate the specimen surface.

The second light source 91 is not specifically limited and may include, for example, a halogen lamp or a white LED. According to the present technology, the third illumination optics 1D includes at least one second light source 91.

The light source lens 92 substantially parallelizes a light beam from the second light source 91. The field stop 93 is positioned so as to be able to adjust an illumination range and conjugate to the specimen surface. The relay lens 94 converges substantially parallel light. The aperture stop 95 is able to adjust brightness. The condenser lens 96 substantially parallelizes divergent light. In the fourth embodiment, a set of these illumination optical members is capable of building a Koehler illumination optics, uniformly illuminating the specimen 100, and acquiring, for example, a bright-field image and a phase-difference image.

2. Fluorescence Microscope System 1000

Figure 9:
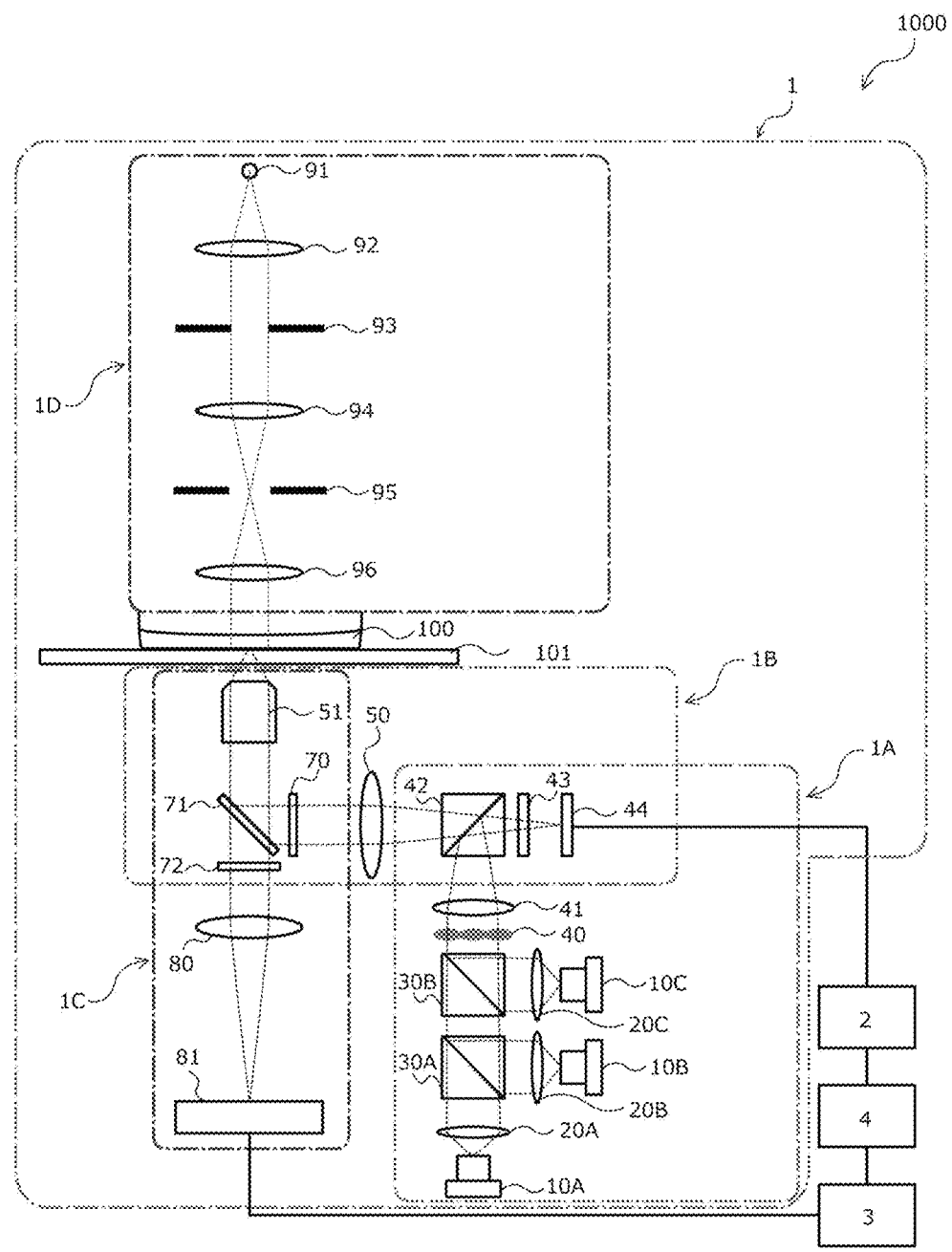
FIG. 9 is a configuration diagram illustrating an example of an overall configuration of a fluorescence microscope system 1000 according to an example embodiment of the present technology.

FIG. 9 is a configuration diagram illustrating an example of an overall configuration of a fluorescence microscope system 1000 according to an example embodiment of the present technology. The fluorescence microscope system 1000 according to the present technology includes the fluorescence microscope apparatus 1, a spatial light modulation element control section 2, a captured-image acquisition section 3, and an image processing section 4. Further, the fluorescence microscope system 1000 according to the present technology may include, for example, some other parts as needed. It should be noted that the fluorescence microscope apparatus 1 is similar to the corresponding apparatus described in "1. Fluorescence Microscope Apparatus 1" and will not be redundantly described.

The individual parts of the fluorescence microscope system 1000 will now be described in detail.

2-1. Spatial Light Modulation Element Control Section 2

The spatial light modulation element control section 2 controls the spatial light modulation element 44 in a desired pattern for exciting the specimen 100. The method of controlling the spatial light modulation element 44 is not specifically limited.

Further, in a case where a plurality of the first light sources 10 are included, the spatial light modulation element control section 2 is able to exercise control in individual light source patterns in synchronism with the individual light sources that provide sequential pulsed light emission.

The spatial light modulation element control section 2 may exercise automatic control in accordance with the position of a cell identified by the later-described image processing section 4 and with a pattern based on a specific part. Further, while exercising control in a pattern for exciting only some specific cells, the spatial light modulation element control section 2 may prevent the discoloration of the other cells by making, for example, focus and light intensity adjustments. Furthermore, the spatial light modulation element control section 2 may exercise pattern control over a user-designated ROI (Region of Interest) in accordance, for example, with an appropriate light source, repetition intervals, and the number of repetitions. Moreover, the spatial light modulation element control section 2 may control a pattern that varies with time.

2-2. Captured-Image Acquisition Section 3

The captured-image acquisition section 3 acquires a captured image from the imaging optics 1C. The method of acquiring a captured-image is not specifically limited.

2-3. Image Processing Section 4

The image processing section 4 processes a captured image that is acquired by the captured-image acquisition section 3. The method of processing the captured image is not specifically limited. In a case where there are a plurality of captured images, they are, for example, computed.

The image processing section 4 may acquire a merely bright integrated image or a wide-range HDR (High Dynamic Range Imaging) image. Further, the image processing section 4 may be able to identify, for example, the position of a cell or a specific part in a cell, such as a nucleus, from a bright-field image or a phase difference image.

According to the present technology, in a case where the first illumination optics 1A and the second illumination optics 2B illuminate light by switching between a plurality of lattice patterns, the image processing section 4 is able to obtain a high-resolution final image from a plurality of captured images acquired by the captured-image acquisition section. It should be noted that this matter will be described in detail later under "3-1. First Application Example (Application to SIM Super-Resolution)."

Further, as regards the first illumination optics 1A according to the present technology, in a case where the specimen 100 is dyed with a plurality of fluorescent dyes, the first illumination optics 1A includes a plurality of the first light sources 10, and the plurality of the first light sources 10 emit light by exciting the plurality of fluorescent dyes, the spatial light modulation element 44 is able to divide an illumination region into a plurality of illumination regions in accordance with the plurality of the first light sources 10, and the image processing section 4 is able to obtain the luminance value of each fluorescent dye, as a reference, from a captured image acquired by the image acquisition section, and perform quantitative evaluation of fluorescence imaging. In this case, the quantitative evaluation of the fluorescence imaging may be compensation and/or unmixing. It should be noted that this matter will be described in detail later under "3-4. Fourth Application Example (Application to Quantitative Evaluation)."

3. Application Examples

Application examples of the present technology will now be described in detail.

3-1. First Application Example (Application to SIM Super-Resolution)

Figure 10:
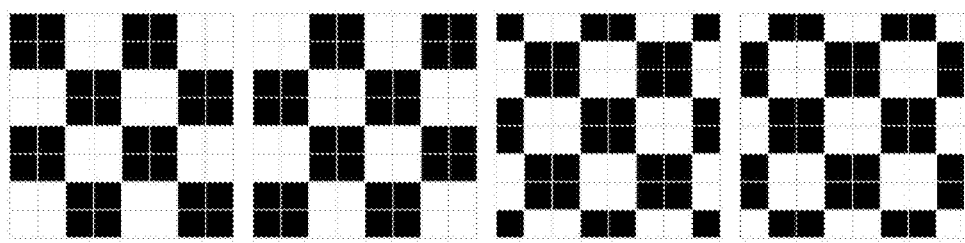
FIG. 10 is a diagram illustrating illumination patterns. Illumination patterns according to the present technology are illustrated at A and B in FIG. 10. A prior art illumination pattern is illustrated at C in FIG. 10.
Figure 10:
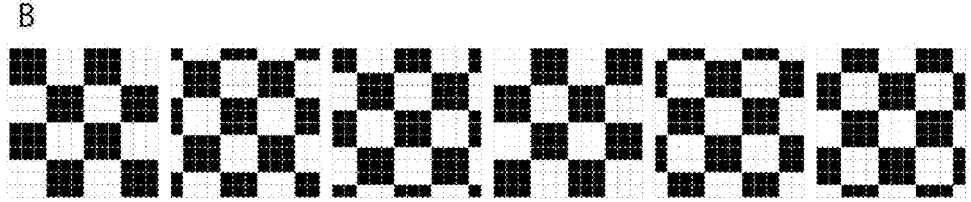
Figure 10:
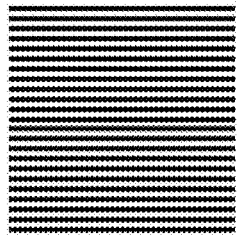

An application to SIM (Structured Illumination Microscopy) super-resolution is described below. SIM is one of various super-resolution imaging (Super Resolution Microscopy (SRM)) techniques, which are optical techniques that achieve a resolution higher than the diffraction limit of a conventional optical microscope. In general, SIM is able to achieve a resolution two times higher than the diffraction limit by illuminating a sample with illumination light in a striped pattern and capturing an image of the striped pattern a number of times while moving the striped pattern. More specifically, for example, a linear pattern depicted at C in FIG. 10 is rotated in three different directions and moved approximately three to five times in a direction orthogonal to lines in the pattern in order to capture an image after each movement. Therefore, it is necessary to capture an image approximately nine to fifteen times in total.

Meanwhile, the present technology enables the first illumination optics 1A and the second illumination optics 2B to illuminate light by switching between a plurality of lattice patterns as mentioned earlier. Therefore, when, for example, a plurality of lattice patterns depicted at A or B in FIG. 10 are used, capturing an image four to six times is sufficient. Consequently, the required number of imaging operations is smaller than when a conventional imaging method is used. This makes it possible to shorten imaging time, improve testing efficiency, and suppress the deterioration (discoloration) of fluorescent dyes.

Further, in the above case, the image processing section 4 is able to obtain a high-resolution final image from a plurality of captured images acquired by the captured-image acquisition section 3, as mentioned earlier. This makes it possible to obtain a SIM super-resolution image that is computed by the image processing section 4.

It should be noted that the plurality of lattice patterns depicted at A or B in FIG. 10 are merely examples. In a case where, for example, the spatial light modulation element 44 is an LCOS, one of the plurality of lattice patterns may be selectively used as appropriate in accordance with an optical resolution determined by the NA of the objective lens 51, the pixel size of the LCOS, and the magnification of the second illumination optics 1B.

For example, in a case where the optical resolution is approximately 0.6 µm, the pixel size of the LCOS is 3 µm, and the magnification of the second illumination optics 1B is twenty times, a suitable lattice pattern (see A in FIG. 10) is such that four pixels form one cycle (=0.6 µm). Meanwhile, in a case where the optical resolution is approximately 0.45 µm, the pixel size of the LCOS is 3 µm, and the magnification of the second illumination optics 1B is forty times, a suitable lattice pattern (see B in FIG. 10) is such that six pixels form one cycle (=0.45 µm). Therefore, it is preferable that the lattice pattern be changed in accordance with the objective lens 51 used for fluorescence observation.

It should be noted that the lattice pattern depicted at A in FIG. 10 includes lattices not excited by 2×2 pixels and lattices excited by 2×2 pixels. However, the lattice pattern may be formed by 4×4 pixels. Such a lattice pattern is suitable for a case where the optical resolution is approximately 0.4 µm, the pixel size of the LCOS is 3 µm, and the magnification of the second illumination optics 1B is sixty times.

Further, the present technology makes it possible to change the lattice pattern in accordance with a light source wavelength. For example, it is possible to use the lattice pattern depicted at A in FIG. 10 for short-wavelength excitation with a high optical resolution and use the lattice pattern depicted at B in FIG. 10 for long-wavelength excitation with a low optical resolution.

Furthermore, the colors of the lattice pattern depicted at A or B in FIG. 10 are not specifically limited. For example, the colors may be not only black and white but also, for example, blue and green. In such a case, a blue-excited SIM super-resolution image and a green-excited SIM super-resolution image can be obtained at the same time.

Moreover, in a case where the imaging element 81 is a color camera, SIM super-resolution images excited by a plurality of colors may be obtained at the same time by capturing an image with the color camera while switching between the emissions of light from a plurality of light sources during the exposure time of the color camera.

Additionally, in a case where the spatial light modulation element 44 is an LCOS, the orientations of the pixels of the imaging element 81 and LCOS are not specifically limited.

3-2. Second Application Example (Application to Multiple Dye Excitation)

In a case where a plurality of fluorescent dyes are excited, brightness may vary from one fluorescent dye to another. Meanwhile, according to the present technology, in a case where the specimen 100 is dyed with a plurality of fluorescent dyes, the first illumination optics 1A is able to control a illumination light source and a illumination place in a spatial-selective manner in accordance with the luminance values of the plurality of fluorescent dyes. Further, in the above case, the spatial light modulation element 44 is able to divide an illumination region into a plurality of illumination regions in accordance with the shape of the specimen 100. As a result, when the shape of the specimen 100 (e.g., a cell containing individual localized dyes or a part within a cell) is identified beforehand in an image recognition manner, it is possible to optimize the intensity of excitation light for each of the relevant regions and capture images of all dyes at substantially the same brightness level.

3-3. Third Application Example (Application to Bayer Excitation)

Figure 11:
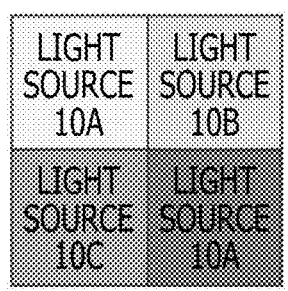
FIG. 11 is a diagram illustrating an example of an illumination region that is substantially divided into a Bayer pattern by a spatial light modulation element 44 based on a plurality of first light sources 10.
Figure 11:
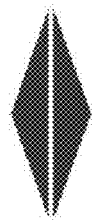
Figure 11:
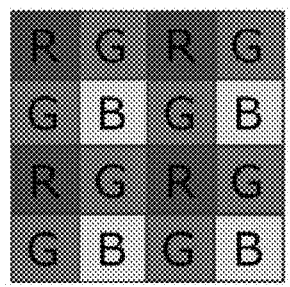

In a case where the first illumination optics 1A includes a plurality of first light sources 10, a plurality of illumination regions based on the plurality of first light sources 10 can be formed in a Bayer array. For example, as depicted in FIG. 11, the plurality of illumination regions based on the plurality of first light sources 10 can be arranged in an array like the Bayer array. When the size and position of the Bayer array of the imaging element 81 (e.g., a color camera) are adjusted to match those of each excitation Bayer array, it is possible to simultaneously obtain the fluorescence images of a plurality of dyes excited by the plurality of first light sources 10.

3-4. Fourth Application Example (Application to Quantitative Evaluation)

The fluorescence microscope apparatus 1 and fluorescence microscope system 1000 according to the present technology can be applied to the quantitative evaluation of the fluorescence imaging, such as fluorescence correction (compensation) and unmixing.

As regards the first illumination optics 1A according to the present technology, in a case where the specimen 100 is dyed with a plurality of fluorescent dyes, the first illumination optics 1A includes a plurality of first light sources 10, and the plurality of first light sources 10 excite the plurality of fluorescent dyes to emit light, an illumination region can be divided into a plurality of illumination regions in accordance with the plurality of first light sources 10.

Further, in the above case, as mentioned earlier, the image processing section 4 is able to obtain the luminance value of each fluorescent dye, as a reference, from a captured image acquired by the image acquisition section, and perform quantitative evaluation of fluorescence imaging.

Figure 12:
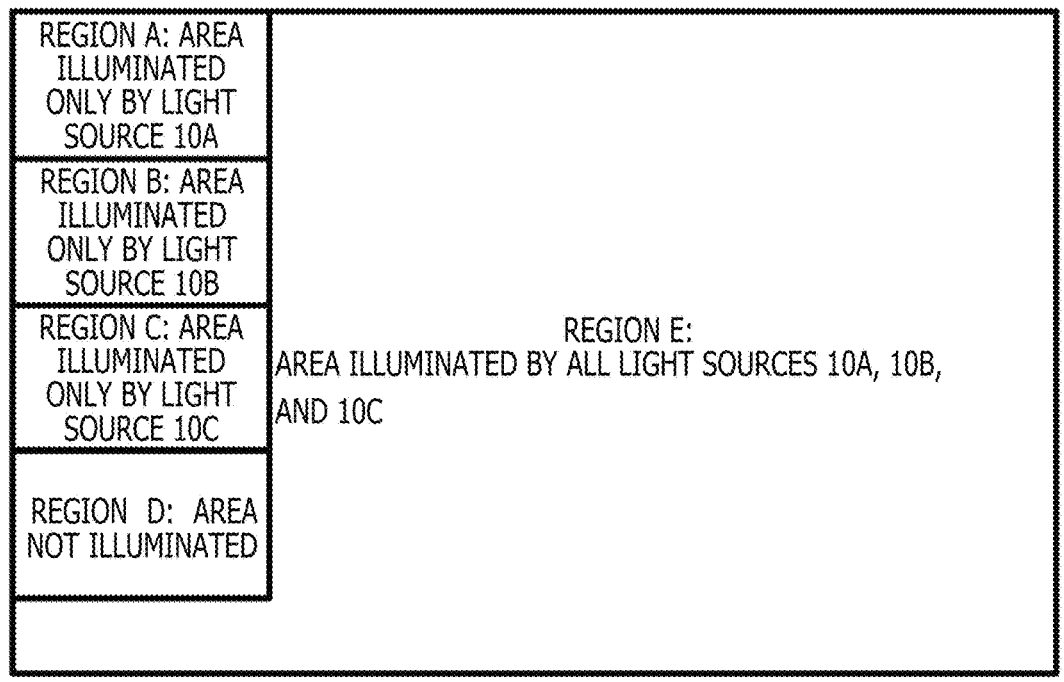
FIG. 12 is a diagram illustrating an example of an illumination region that is divided into a plurality of regions by the spatial light modulation element 44 based on a plurality of first light sources 10.

More specifically, as depicted, for example, in FIG. 12, a region to be illuminated by the spatial light modulation element 44 is divided into a plurality of regions, namely, region A, region B, region C, region D, and region E. Region A is an area illuminated only by the light source 10A, which excites dye α. Region B is an area illuminated only by the light source 10B, which excites dye 13. Region C is an area illuminated only by the light source 10C, which excites dye α. Region D is an area not illuminated by any light source (and used for background illumination correction). Region E is an area illuminated by all light sources. The specimen is then excited to capture an image with the imaging element 81 (with a color camera in this instance). Subsequently, RGB (Red, Green, Blue) luminance values of regions A to D are used as reference values. Consequently, the quantitative evaluation of a fluorescence image, such as compensation and unmixing, can be made with respect to each pixel in an image of region E by performing a single imaging operation (as far as the three light sources sequentially emit light during the exposure time by using a three-wavelength filter). It should be noted that, for example, the sizes and arrangement of the regions for illuminating the individual areas depicted in FIG. 12 are illustrative and not restrictive. The present technology is not limited to the sizes and arrangement of the regions depicted in FIG. 12.

Further, according to the present technology, an alternative is to first acquire reference data by capturing an image of an area formed only by regions A to D, and then separately capture an image of an area formed only by region E.

It should be noted that the above description uses RGB luminance values as reference values for exemplification purposes. However, the present technology is not limited to such an example. In a case where, for example, the employed imaging element 81 has a four-channel RGBI configuration for receiving light in an infrared wavelength region in addition to RGB light, luminance values (R, G, B, I) from four channels can be used as the reference values.

Furthermore, according to the present technology, a plurality of fluorescent dyes having one wavelength and different luminance values can be excited by performing an additional process of identifying a cell containing individual localized dyes or a part within a cell beforehand in an image recognition manner. Stated differently, an increased number of fluorescent dyes can be used by performing compensation or unmixing of each part. This makes it possible to acquire accurate light emission information regarding each fluorescent dye and increase the total number of dyes that can be disposed in the field of view.

Moreover, in the above case, a plurality of first light sources (e.g., 10A, 10B, and 10C) may be applied in a manner that varies from one part to another. This makes it possible, for example, to optimize the intensity of excitation light and capture images of all dyes at substantially the same brightness level.

Additionally, the present technology makes it possible, for example, to make a cancer diagnosis, for instance, from later-described "αb comp, βg comp, γr comp" determined by compensation, the relative proportion between "L, M, N" determined by unmixing, their percentages to the total, their distribution profiles, and the relationship between their distribution profiles.

It should be noted that the imaging element 81 in the present application example may be of a single-plate type or a three-plate type. However, it is preferable that a three-plate type imaging element 81 be used for higher resolution.

3-4-1. Example of Acquisition of Reference Luminance Value

An example of acquisition of a reference luminance value will now be described.

Figure 13:
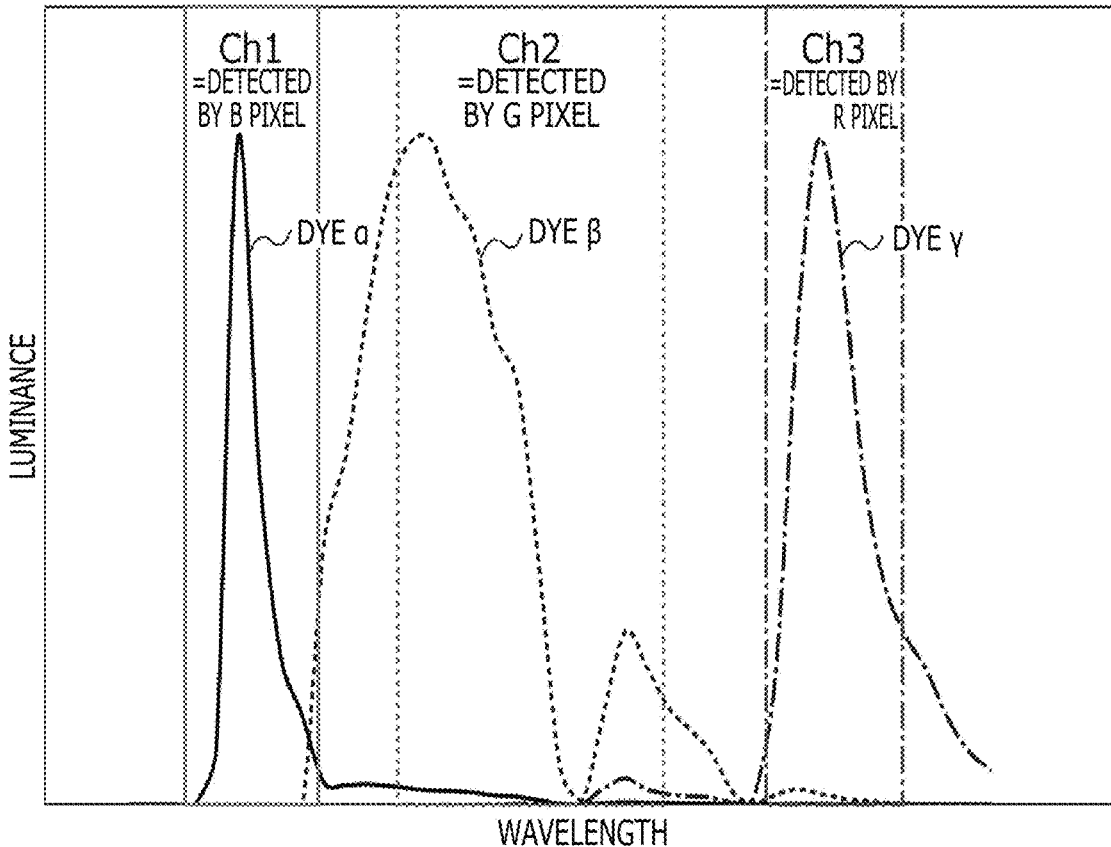
FIG. 13 is a drawing-substitute graph illustrating how a luminance value is acquired as a reference.

FIG. 13 is a drawing-substitute graph illustrating how a luminance value is acquired as a reference in a case where the first illumination optics 1A includes a plurality of first light sources 10 and the plurality of first light sources 10 (e.g., 10A, 10B, and 10C) excite the plurality of fluorescent dyes to emit light. No matter whether fluorescence correction or unmixing is to be performed, it is first necessary, for example, to acquire RGB luminance values of each fluorescent dye as reference values.

More specifically, it is necessary to acquire RGB luminance values ($\alpha r$, $\alpha g$, $\alpha b$) in a situation where only dye α is excited to capture an image, RGB luminance values $\beta r$, $\beta g$, $\beta b$) in a situation where only dye β is excited to capture an image, and RGB luminance values ($\gamma r$, $\gamma g$, $\gamma b$) in a situation where only dye γ is excited to capture an image.

3-4-2. Example of Fluorescence Correction (Compensation)

An example of fluorescence correction will now be described.

For example, the RGB luminance values of each pixel in an image captured by exciting dyes A, B, and C are as follows:

$$B = \alpha b + \beta b + \gamma b \qquad (1)$$

$$G = \alpha g + \beta g + \gamma g \qquad (2)$$

$$R = \alpha r + \beta r + \gamma r \qquad (3)$$

If a reference is acquired, the percentage of βb to βg and the percentage of γb to γr are known and they are 3% and 1%, respectively, the following equation is obtained from Equation (1) above:

$$\alpha b \text{ comp} = B - 0.03 \times G - 0.01 \times R$$

Then, βg comp and γr comp can be similarly obtained from Equations (2) and (3) above.

Figure 14:
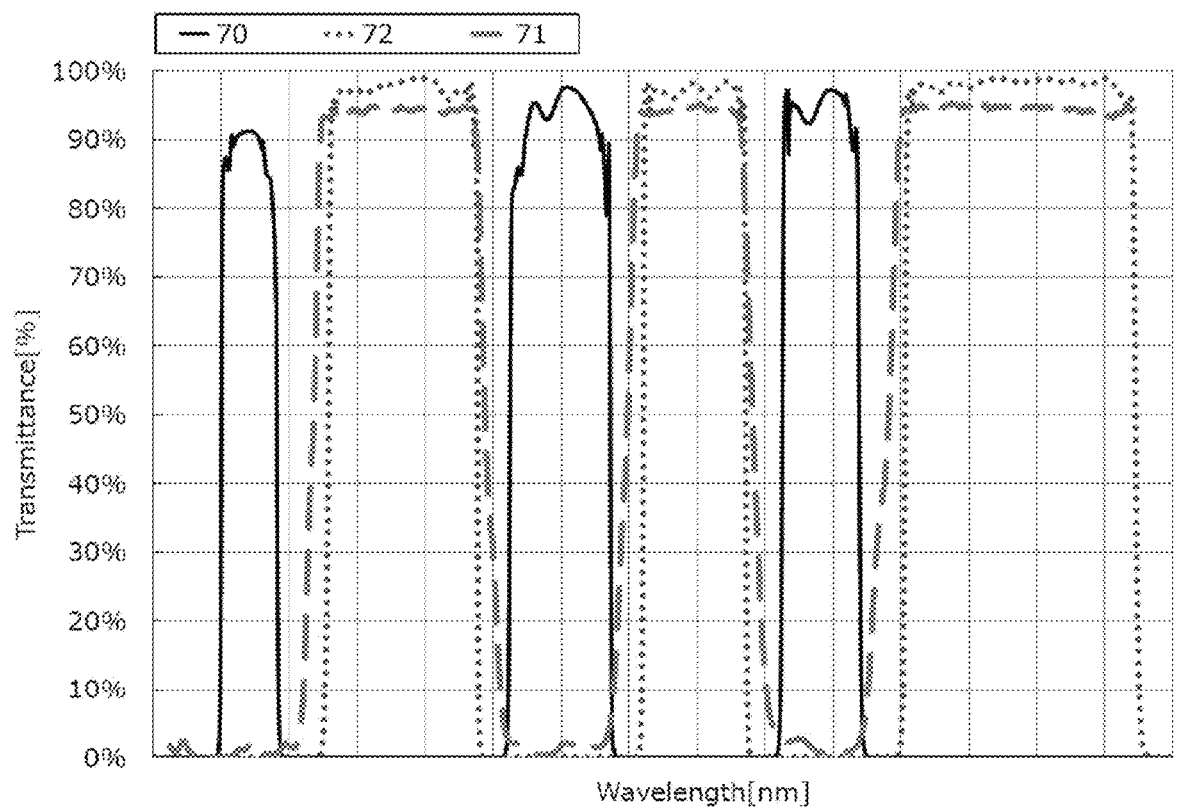
FIG. 14 is a diagram illustrating examples of filters corresponding to different wavelengths.

FIG. 14 is a diagram illustrating examples of filters corresponding to different wavelengths. Numbers in FIG. 14 respectively correlate to the bandpass filter 70, the dichroic mirror 71, and the bandpass filter 72, which are depicted in FIGS. 1, 3, and 7 to 9. Referring, for example, to FIG. 12, when a signal in region E is corrected (compensated) as described above, accurate light emission information regarding each fluorescent dye can be acquired by performing a single imaging operation (e.g., causing the three light sources (10A, 10B, and 10C) to emit light during the exposure time).

3-4-3. Example of Unmixing

An example of unmixing will now be described.

For example, the RGB luminance values of each pixel in an image captured by exciting dyes A, B, and C are as follows:

$$(R,G,B) = L \times (\alpha r, \alpha g, \alpha b) + M \times (\beta r, \beta g, \beta b) + N \times (\gamma r, \gamma g, \gamma b)$$

Then, L, M, and N, namely, the intensities of individual fluorescent dyes, can be determined from simultaneous equations of each of the RGB luminance values.

It should be noted that the present technology may adopt the following configurations.

(1)

A fluorescence microscope apparatus including:

a first illumination optics that includes a first light source for exciting fluorescence in a specimen, a special light modulation element, and a first illumination optical member for uniformly illuminating the spatial light modulation element;

a second illumination optics that includes a second illumination optical member for forming an image of a light beam from the spatial light modulation element on a specimen surface; and an imaging optics that includes an imaging optical member and an imaging element, the imaging optical member being adapted to capture an image of the specimen surface.

(2)

The fluorescence microscope apparatus according to (1) above, in which the spatial light modulation element includes an LCOS (Liquid Crystal on Silicon).

(3)

The fluorescence microscope apparatus according to (2) above, in which the first illumination optics further includes a polarization compensation element.

(4)

The fluorescence microscope apparatus according to any one of (1) to (3) above, in which the first illumination optics further includes a speckle elimination element.

(5)

The fluorescence microscope apparatus according to any one of (1) to (4) above, in which the first illumination optics and the second illumination optics illuminate light by switching between a plurality of lattice patterns.

(6)

The fluorescence microscope apparatus according to any one of (1) to (5) above, in which the specimen is dyed with a plurality of fluorescent dyes.

(7)

The fluorescence microscope apparatus according to (6) above, in which the first illumination optics includes a plurality of the first light sources, and the plurality of the first light sources emit light by exciting the plurality of fluorescent dyes.

(8)

The fluorescence microscope apparatus according to (6) or (7) above, in which the first illumination optics controls the intensity of illuminated light in accordance with luminance values of the plurality of fluorescent dyes.

(9)

The fluorescence microscope apparatus according to any one of (6) to (8) above, in which the spatial light modulation element divides an illumination region into a plurality of illumination regions in accordance with the shape of the specimen.

(10)

The fluorescence microscope apparatus according to (7) above, in which the spatial light modulation element divides an illumination region into a plurality of illumination regions in accordance with the plurality of the first light sources.

(11)

The fluorescence microscope apparatus according to (7) or (10), in which a plurality of illumination regions based on the plurality of the first light sources are arranged in a Bayer array.

(12)

The fluorescence microscope apparatus according to any one of (1) to (11), further including:

a third illumination optics that includes a second light source and a third illumination optical member for uniformly illuminating the specimen surface.

(13)

The fluorescence microscope apparatus according to any one of (1) to (12), in which the specimen includes a biological sample.

(14)

A fluorescence microscope system including:

a fluorescence microscope apparatus that includes a first illumination optics including a first light source exciting fluorescence in a specimen, a spatial light modulation element, and a first illumination optical member uniformly illuminating the spatial light modulation element, a second illumination optics including a second illumination optical member for forming an image of a light beam from the spatial light modulation element on a specimen surface, and an imaging optics including an imaging optical member being adapted to capture an image of the specimen surface and an imaging element;

a spatial light modulation element control section that controls the spatial light modulation element;

a captured-image acquisition section that acquires a captured image from the imaging optics; and an image processing section that processes a captured image acquired by the captured-image acquisition section.

(15)

The fluorescence microscope system according to (14), in which the first illumination optics and the second illumination optics illuminate light by switching between a plurality of lattice patterns, and the image processing section obtains a high-resolution final image from a plurality of captured images acquired by the captured-image acquisition section.

(16)

The fluorescence microscope system according to (14) or (15) above, in which the specimen is dyed with a plurality of fluorescent dyes.

(17)

The fluorescence microscope system according to (16) above, in which the first illumination optics includes a plurality of the first light sources, the plurality of the first light sources emit light by exciting the plurality of fluorescent dyes, the spatial light modulation element divides an illumination region into a plurality of illumination regions in accordance with the plurality of the first light sources, and the image processing section obtains a luminance value of each fluorescent dye, as a reference, from a captured image acquired by the image acquisition section, and performs quantitative evaluation of fluorescence imaging.

(18)

The fluorescence microscope system according to (17) above, in which the quantitative evaluation of the fluorescence imaging includes compensation and/or unmixing.

REFERENCE SIGNS LIST

1: Fluorescence microscope apparatus
10, 10A, 10B, 10C: First light source
20, 20A, 20B, 20C: Coupling lens
30, 30A, 30B: Optical path combination element
40: Integrator
41: Condenser lens
42: Polarization beam splitter
43: Polarization compensation element
44: Spatial light modulation element
45: Speckle elimination element
50: Condenser lens
51: Objective lens
70: Bandpass filter
71: Dichroic mirror
72: Bandpass filter
80: Image-forming lens
81: Imaging element
91: Second light source
92: Light source lens
93: Field stop
94: Relay lens
95: Aperture stop
96: Condenser lens
100: Specimen
101: Stage
1000: Fluorescence microscope system
1A: First illumination optics
1B: Second illumination optics
1C: Imaging optics
1D: Third illumination optics
2: Spatial light modulation element control section
3: Captured-image acquisition section
4: Image processing section

The invention claimed is:

1. A fluorescence microscope apparatus comprising:
a first illumination optics that includes a first light source for exciting fluorescence in a specimen, a spatial light modulation element, and a first illumination optical member for uniformly illuminating the spatial light modulation element, wherein the first illumination optics further includes a polarization beam splitter disposed on an optical path between the first illumination optical member and the spatial light modulation element, and a polarization compensation element disposed between the polarization beam splitter and the spatial light modulation element;
a second illumination optics that includes a second illumination optical member for forming an image of a light beam from the spatial light modulation element on a specimen surface; and
an imaging optics that includes an imaging optical member and an imaging element, the imaging optical member being adapted to capture an image of the specimen surface.

2. The fluorescence microscope apparatus according to claim 1, wherein
the spatial light modulation element includes an LCOS (Liquid Crystal on Silicon).

3. The fluorescence microscope apparatus according to claim 1, wherein
the first illumination optics further includes a speckle elimination element.

4. The fluorescence microscope apparatus according to claim 1, wherein
the first illumination optics and the second illumination optics illuminate light by switching between a plurality of lattice patterns.

5. The fluorescence microscope apparatus according to claim 1, wherein
the specimen is dyed with a plurality of fluorescent dyes.

6. The fluorescence microscope apparatus according to claim 5, wherein
the first illumination optics includes a plurality of the first light sources, and
the plurality of the first light sources emit light by exciting the plurality of fluorescent dyes.

7. The fluorescence microscope apparatus according to claim 6, wherein
the spatial light modulation element divides an illumination region into a plurality of illumination regions in accordance with the plurality of the first light sources.

8. The fluorescence microscope apparatus according to claim 6, wherein
a plurality of illumination regions based on the plurality of the first light sources are arranged in a Bayer array.

9. The fluorescence microscope apparatus according to claim 5, wherein
the first illumination optics controls the intensity of illuminated light in accordance with luminance values of the plurality of fluorescent dyes.

10. The fluorescence microscope apparatus according to claim 5, wherein
the spatial light modulation element divides an illumination region into a plurality of illumination regions in accordance with the shape of the specimen.

11. The fluorescence microscope apparatus according to claim 1, further comprising:
a third illumination optics that includes a second light source and a third illumination optical member for uniformly illuminating the specimen surface.

12. The fluorescence microscope apparatus according to claim 1, wherein
the specimen includes a biological sample.

13. The fluorescence microscope apparatus according to claim 1, wherein the polarization compensation element is configured to impart a phase difference having opposite polarities and substantially equal absolute values when light is incident from a side toward the polarization beam splitter and when light is incident from a side toward the spatial light modulation element.

14. A fluorescence microscope system comprising:
a fluorescence microscope apparatus that includes
a first illumination optics including a first light source exciting fluorescence in a specimen, a spatial light modulation element, and a first illumination optical member uniformly illuminating the spatial light modulation element, wherein the first illumination optics further includes a polarization beam splitter disposed on an optical path between the first illumination optical member and the spatial light modulation element, and a polarization compensation element disposed between the polarization beam splitter and the spatial light modulation element,
a second illumination optics including a second illumination optical member for forming an image of a light beam from the spatial light modulation element on a specimen surface, and
an imaging optics including an imaging optical member being adapted to capture an image of the specimen surface and an imaging element;
a spatial light modulation element control section that controls the spatial light modulation element;
a captured-image acquisition section that acquires a captured image from the imaging optics; and
an image processing section that processes a captured image acquired by the captured-image acquisition section.

15. The fluorescence microscope system according to claim 14, wherein
the first illumination optics and the second illumination optics illuminate light by switching between a plurality of lattice patterns, and
the image processing section obtains a high-resolution final image from a plurality of captured images acquired by the captured-image acquisition section.

16. The fluorescence microscope system according to claim 14, wherein
the specimen is dyed with a plurality of fluorescent dyes.

17. The fluorescence microscope system according to claim 16, wherein
the first illumination optics includes a plurality of the first light sources,
the plurality of the first light sources emit light by exciting the plurality of fluorescent dyes,
the spatial light modulation element divides an illumination region into a plurality of illumination regions in accordance with the plurality of the first light sources, and
the image processing section obtains a luminance value of each fluorescent dye, as a reference, from a captured image acquired by the image acquisition section, and performs quantitative evaluation of fluorescence imaging.

18. The fluorescence microscope system according to claim 17, wherein
the quantitative evaluation of the fluorescence imaging includes compensation and/or unmixing.

19. The fluorescence microscope system according to claim 14, wherein the polarization compensation element is configured to impart a phase difference having opposite polarities and substantially equal absolute values when light is incident from a side toward the polarization beam splitter and when light is incident from a side toward the spatial light modulation element.

* * * * *